United States Patent
Leproust et al.

(10) Patent No.: US 7,252,938 B2
(45) Date of Patent: Aug. 7, 2007

(54) METHODS AND DEVICES FOR PRODUCING A POLYMER AT A LOCATION OF A SUBSTRATE

(75) Inventors: Eric M. Leproust, Campbell, CA (US); Douglas A. Amorese, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 677 days.

(21) Appl. No.: 10/374,857

(22) Filed: Feb. 25, 2003

(65) Prior Publication Data

US 2004/0166496 A1    Aug. 26, 2004

(51) Int. Cl.
| | |
|---|---|
| *C12Q 1/00* | (2006.01) |
| *C12Q 1/68* | (2006.01) |
| *C12M 1/36* | (2006.01) |
| *C12M 3/00* | (2006.01) |
| *G01N 33/53* | (2006.01) |
| *G01N 33/566* | (2006.01) |
| *G01N 33/543* | (2006.01) |
| *G01N 33/551* | (2006.01) |
| *G01N 33/544* | (2006.01) |
| *G01N 21/00* | (2006.01) |
| *G01N 21/75* | (2006.01) |
| *G01N 21/76* | (2006.01) |

(52) U.S. Cl. .............. 435/6; 435/4; 435/7.1; 435/286.2; 435/287.2; 436/501; 436/518; 436/524; 436/528; 436/164; 436/166; 436/172; 436/807; 436/809

(58) Field of Classification Search .............. 435/4, 435/6, 7.1, 286.2, 287.2; 436/501, 518, 524, 436/528, 164, 166, 172, 807, 809
See application file for complete search history.

(56) References Cited

U.S. PATENT DOCUMENTS

| | | | | |
|---|---|---|---|---|
| 4,328,504 A | * | 5/1982 | Weber et al. | ............ 347/14 |
| 5,843,655 A | * | 12/1998 | McGall | ............ 435/6 |
| 6,015,880 A | * | 1/2000 | Baldeschwieler et al. | ... 530/333 |
| 6,232,072 B1 | | 5/2001 | Fisher | |

(Continued)

OTHER PUBLICATIONS

Khan, A.; Ossadtchi, A.; Leahy, R.; and Smith, D. "Error-correcting microarray design." Genomics. vol. 81 (2003) 157-165.*

(Continued)

*Primary Examiner*—Long V. Le
*Assistant Examiner*—Jacqueline A. DiRamio

(57) ABSTRACT

Methods and devices for producing a polymer at a location of a substrate are provided. In the subject methods, a fluid droplet containing a first monomer labeled with a first detectable label is deposited from a fluid deposition device onto a location of a substrate surface having a second monomer labeled with a second detectable label. The first and second detectable labels are then detected to determine any misalignment between the fluid deposition device and the location of the substrate surface during deposition. Also provided are algorithms that perform the subject methods, as well as fluid deposition devices that include the subject algorithms. The subject invention also includes arrays produced according to the subject methods and kits that include the subject arrays.

20 Claims, 11 Drawing Sheets

U.S. PATENT DOCUMENTS

| | | | |
|---|---|---|---|
| 6,284,465 | B1 | 9/2001 | Wolber |
| 6,300,137 | B1 | 10/2001 | Earhart et al. |
| 6,902,897 | B2 * | 6/2005 | Tweedie et al. ............... 435/6 |
| 7,101,508 | B2 * | 9/2006 | Thompson et al. ........... 422/67 |
| 2002/0009744 | A1 * | 1/2002 | Bogdanov ...................... 435/6 |
| 2005/0014147 | A1 * | 1/2005 | Hessner ......................... 435/6 |

OTHER PUBLICATIONS

Graves et al. "System for Preparing Microhybridization Arrays on Glass Slides," Anal. Chem. vol. 70 (1998) 5085-5092.*

Ramakrishnan et al. "An assessment of Motorola CodeLink(TM) microarray performance for gene expression profiling applications," Nucleic Acids Research. vol. 30, No. 7 (2002) e30.*

* cited by examiner

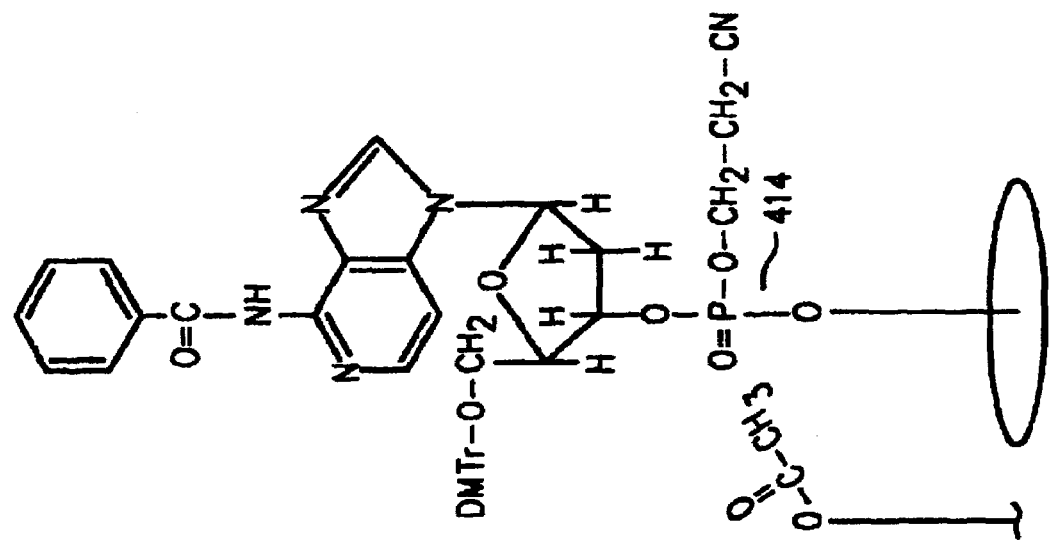
FIG. 4B
(PRIOR ART)
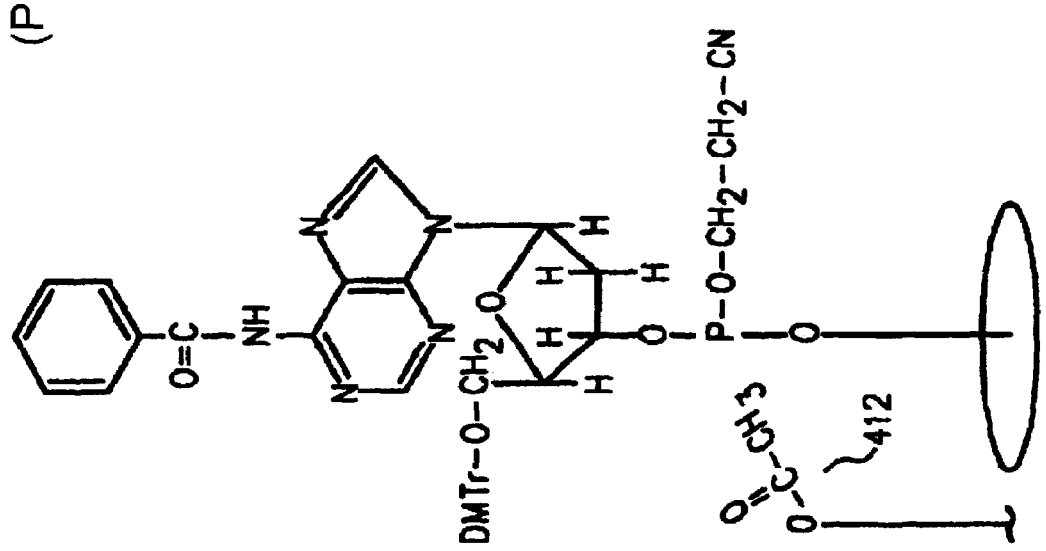

METHODS AND DEVICES FOR PRODUCING A POLYMER AT A LOCATION OF A SUBSTRATE

FIELD OF THE INVENTION

The field of this invention is biopolymeric arrays.

BACKGROUND OF THE INVENTION

Array assays between surface bound binding agents or probes and target molecules in solution may be used to detect the presence of particular analytes or biopolymers in the solution. The surface-bound probes may be oligonucleotides, peptides, polypeptides, proteins, antibodies or other molecules capable of binding with target biomolecules in the solution. Such binding interactions are the basis for many of the methods and devices used in a variety of different fields, e.g., genomics (in sequencing by hybridization, SNP detection, differential gene expression analysis, identification of novel genes, gene mapping, finger printing, etc.) and proteomics.

One typical array assay method involves biopolymeric probes immobilized in an array on a substrate such as a glass substrate or the like. A solution suspected of containing an analyte or target molecule(s) ("target") that binds with the attached probes is placed in contact with the bound probes under conditions sufficient to promote binding of targets in the solution to the complementary probes on the substrate to form a binding complex that is bound to the surface of the substrate. The pattern of binding by target molecules to probe features or spots on the substrate produces a pattern, i.e., a binding complex pattern, on the surface of the substrate which is detected. This detection of binding complexes provides desired information about the target biomolecules in the solution.

The binding complexes may be detected by reading or scanning the array with, for example, optical means, although other methods may also be used, as appropriate for the particular assay. For example, laser light may be used to excite fluorescent labels attached to the targets, generating a signal only in those spots on the array that have a labeled target molecule bound to a probe molecule. This pattern may then be digitally scanned for computer analysis. Such patterns can be used to generate data for biological assays such as the identification of drug targets, single-nucleotide polymorphism mapping, monitoring samples from patients to track their response to treatment, assessing the efficacy of new treatments, etc.

There are two main ways of producing polymeric arrays in which the immobilized polymers are covalently attached to the substrate surface: via in situ synthesis in which the polymers are grown on the surface of the substrate in a step-wise fashion and via deposition of the full polymer, e.g., a presynthesized nucleic acid/polypeptide, cDNA fragment, etc., onto the surface of the array.

Where the in situ synthesis approach is employed, conventional phosphoramidite synthesis protocols are typically used. In phosphoramidite synthesis protocols, the 3'-hydroxyl group of an initial 5'-protected nucleoside is first covalently attached to the polymer support, e.g., a planar substrate surface. Synthesis of the nucleic acid then proceeds by deprotection of the 5'-hydroxyl group of the attached nucleoside, followed by coupling of an incoming nucleoside-3'-phosphoramidite to the deprotected 5' hydroxyl group (5'-OH). The resulting phosphite triester is finally oxidized to a phosphotriester to complete the internucleotide bond. The steps of deprotection, coupling and oxidation are repeated until a nucleic acid of the desired length and sequence is obtained.

It will be apparent that the effectiveness of employing these arrays depends on the precision with which these oligonucleotides can be synthesized on the substrate surface. As with any chemical process, certain factors may cause the yields of specific steps in the synthesis of oligonucleotides to be less than 100%, resulting in unintended or unwanted intermediate species.

Oftentimes in situ synthesis is carried-out by way of highly automated methods that employ pulse-jet fluid deposition technology in which thermal or piezo pulse jet devices analogous to inkjet printing devices are employed to deposit fluids of biopolymeric precursor molecules, i.e., monomers, onto a substrate surface. For example, Roda et al., Biotechniques (2000) 28:492-496, describe a method in which a conventional inkjet printer is used for the microdeposition of proteins. In this report, the black ink was removed from a Hewlett Packard ink cartridge and the cartridge was extensively washed with water. The cartridge was filled with the protein deposition solution using a microsyringe and sealed. U.S. patents disclosing thermal and/or piezo pulse jet deposition of biopolymer containing fluids onto a substrate include: U.S. Pat. Nos. 4,877,745; 5,449,754; 5,474,796; 5,658,802; 5,700,637; and 5,958,342.

In this manner, a series of droplets, each containing one particular type of reactive deoxynucleoside phosphoramidite is sequentially applied to each discrete area or "feature", sometimes referred to as a "spot" of the array by a pulse-jet printhead. The inventors have realized that, unfortunately, the precision at which successive droplets can be applied to a feature is insufficient to guarantee that each successive droplet is deposited at the precise location to which it is intended, i.e., to ensure that each successive droplet is confined to the intended feature area or that the entire feature will be covered by any particular droplet. Misregistration of successively applied droplets may lead to significant amounts of undesriable polymers that are unintentionally synthesized along with a desired polymer within each feature, and may, in addition, lead to synthesis of unwanted polymers in regions of the surface of the array substrate adjacent to each feature.

More specifically, during fabrication of in situ oligonucleotide arrays, the oligonucleotide synthesis cycle is spatially controlled to initiate synthesis and perform successive couplings at specific locations on the substrate surface. Accordingly, coupling of the phosphoramidites is spatially controlled using pulsejet fluid deposition technology and the remainder of the steps, e.g., capping, oxidation, etc., is performed in a flow cell. Consequently, during the synthesis of each successive oligonucleotide layer, the solid support is transferred between a stage such as an XYZ stage of a spatially controlled reaction module for coupling and a non-spatially controlled reaction module for capping, oxidation, etc. Therefore, spatial registration and alignment is necessary prior to coupling in the spatially controlled reaction module to ensure that the phosphoramidite reagents are delivered at the same locations as the previous reagents. The inventors have realized that a shift or misalignment in the stage position and/or in the alignment system that controls the alignment of the deposition head of the spatially controlled reaction module results in a misalignment in the location of the delivered droplets of phosphoramidites reagents at different layers of the synthesis. Consequently, a mixture of full length or intended sequences and unintended sequences may be produced.

FIG. 1 shows the result of such a misalignment as discovered by the inventors where a two step synthesis process, i.e., a two-layer synthesis made of two nucleotides, i.e., a dinucleotide, is illustrated. The misalignment during synthesis due to a shift in the stage and/or in the alignment system results in a first layer or first droplet 112 that includes a first deposited nucleotide and a second layer or second droplet 114 that includes a second deposited nucleotide, where the two layers are not correctly positioned with respect to each other. As shown, due to the misalignment, the inventors have realized that three discrete regions are produced instead of a desired single region having the full length intended nucleic acid that would have been the result if no misalignment occurred. Accordingly, region 113 is made-up of only the first nucleotide. A misalignment causes the second layer to be shifted with respect to the first layer resulting in a region 115 that is made-up of only the second nucleotide. Due to a portion of the second droplet overlaying a portion of the first droplet, third region 116 is also produced and includes the intended full length sequence made-up of both first and second nucleotides coupled together. This misalignment can be repeated for each sequential nucleotide addition.

Furthermore, the synthesized oligonucloetides may be composed of one or more of, oftentimes all of, four different nucleotides in a particular sequence, where the nucleotides may be delivered by pulse-jet fluid deposition printheads during coupling in the spatially controlled reaction module. Typically, these printheads include one or more nozzles or apertures thereon, through which a precursor reagent, e.g., a particular nucleotide, is dispensed. The precursor reagents are typically contained within one or more reagent reservoirs that are associated with the printheads, and more specifically one or more nozzles of a printhead. The number of nozzles per reservoir or per printhead may vary and may range from about 2 about 1024, e.g., from about 20 to about 256. Accordingly, the number of printheads employed may vary and may range from four printheads such that each type of nucleotide may be deposited by an individual, independent printhead to two printheads such that two types of nucleotides may be delivered by a single printhead having two reagent reservoirs associated therewith.

Thus, the relative misalignment between two printheads may therefore be determined by the relative alignment of the printhead nozzles with respect to each other, e.g., a nozzle of one printhead relative to a nozzle of another printhead. Accordingly, a misalignment of any of these printheads, or rather the nozzles of the printheads, relative to each other will produce a mixture of full length sequences, i.e., intended sequences, and unintended sequences.

Regardless of how the unintended sequences are produced, when contacted with a sample containing labeled target molecules during an array assay, not only can the full length intended sequence bind labeled target molecules in the sample, but also one or more unintended sequences can bind labeled target molecules in the sample. The inventors have realized that the presence of these undesirable polymers produced on the substrate surface may lead to less specific binding of radioactively, fluorescently or chemiluminescently labeled target to the array, in turn leading to a significant decrease in the signal-to-noise ratio in the analysis of the array which may compromise array assay results.

Accordingly, there continues to be an interest in the development of new methods to detect and correct fluid deposition misalignments which may occur during in situ synthesis of polymers at a location of a substrate surface using a fluid deposition device. Of particular interest is the development of such methods that are easy to use, are effective at detecting misalignments, and which enable immediate or "real time" detection and/or adjustments of a fluid deposition device and a substrate surface relative to each other if misalignment is detected so that the misalignment may be corrected for subsequent deposition cycles.

SUMMARY OF THE INVENTION

Methods and devices for producing a polymer at a location of a substrate are provided. In the subject methods, a fluid droplet containing a first monomer labeled with a first detectable label is deposited from a fluid deposition device onto a location of a substrate surface having a second monomer labeled with a second detectable label. The first and second detectable labels are then detected to determine any misalignment between the fluid deposition device and the location of the substrate surface during deposition. Also provided are algorithms that perform the subject methods, as well as fluid deposition devices that include the subject algorithms. The subject invention also includes arrays produced according to the subject methods and kits that include the subject arrays.

BRIEF DESCRIPTIONS OF THE DRAWINGS

FIGS. 4A and 4B illustrate the chemical steps employed to link a first deoxynucleoside phosphoramidite monomer to a free hydroxyl group on the surface of a substrate.

DEFINITIONS

Figure 1:
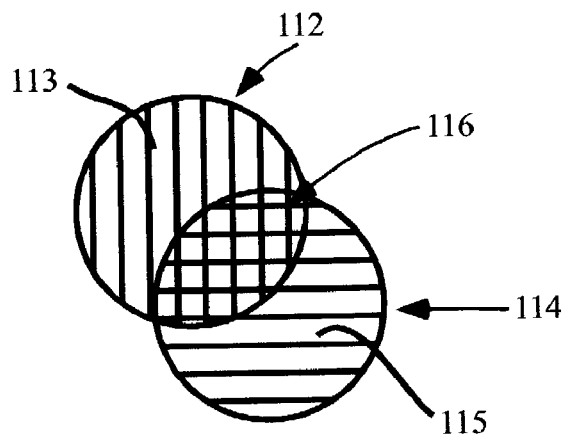
FIG. 1 shows the effects of misalignment of a stage such as an XYZ stage and/or an alignment system of a fluid deposition device.

The term "nucleic acid" as used herein means a polymer composed of nucleotides, e.g. deoxyribonucleotides or ribonucleotides, or compounds produced synthetically (e.g. PNA as described in U.S. Pat. No. 5,948,902 and the references cited therein) which can hybridize with naturally occurring nucleic acids in a sequence specific manner analogous to that of two naturally occurring nucleic acids, e.g., can participate in hybridization reactions, i.e., cooperative interactions through Pi electrons stacking and hydrogen bonds, such as Watson-Crick base pairing interactions, Wobble interactions, etc.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to 100 nucleotides and up to 200 nucleotides in length.

The term "polynucleotide" as used herein refers to single or double stranded polymer composed of nucleotide monomers of generally greater than 100 nucleotides in length.

The term "monomer" as used herein refers to a chemical entity that can be covalently linked to one or more other such entities to form an oligomer. Examples of "monomers" include nucleotides, amino acids, saccharides, peptides, and the like.

In general, the monomers used in conjunction with the present invention have first and second sites (e.g., C-termini and N-termini, or 5' and 3' sites) suitable for binding to other like monomers by means of standard chemical reactions (e.g., condensation, nucleophilic displacement of a leaving group, or the like), and a diverse element which distinguishes a particular monomer from a different monomer of the same type (e.g., an amino acid side chain, a nucleotide base, etc.). The initial substrate-bound monomer is generally used as a building-block in a multi-step synthesis procedure to form a complete polymer or ligand, such as in the synthesis of oligonucleotides, oligopeptides, and the like.

The term "oligomer" is used herein to indicate a chemical entity that contains a plurality of monomers. As used herein, the terms "oligomer" and "polymer" are used interchangeably. Examples of oligomers and polymers include polydeoxyribonucleotides (DNA), polyribonucleotides (RNA), other polynucleotides which are C-glycosides of a purine or pyrimidine base, polypeptides (proteins), polysaccharides (starches, or polysugars), and other chemical entities that contain repeating units of like chemical structure.

The terms "nucleoside" and "nucleotide" are intended to include those moieties which contain not only the known purine and pyrimidine bases, but also other heterocyclic bases that have been modified. Such modifications include methylated purines or pyrimidines, acylated purines or pyrimidines, alkylated riboses or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

"Optional" or "optionally" means that the subsequently described circumstance may or may not occur, so that the description includes instances where the circumstance occurs and instances where it does not.

An "array," includes any two-dimensional or substantially two-dimensional (as well as a three-dimensional) arrangement of addressable regions bearing a particular chemical moiety or moieties (e.g., biopolymers such as polynucleotide or oligonucleotide sequences (nucleic acids), polypeptides (e.g., proteins), carbohydrates, lipids, etc.) associated with that region. In the broadest sense, the preferred arrays are arrays of polymeric binding agents, where the polymeric binding agents may be any of: polypeptides, proteins, nucleic acids, polysaccharides, synthetic mimetics of such biopolymeric binding agents, etc. In many embodiments of interest, the arrays are arrays of nucleic acids, including oligonucleotides, polynucleotides, cDNAs, mRNAs, synthetic mimetics thereof, and the like. Where the arrays are arrays of nucleic acids, the nucleic acids may be covalently attached to the arrays at any point along the nucleic acid chain, but are generally attached at one of their termini (e.g. the 3' or 5' terminus). Sometimes, the arrays are arrays of polypeptides, e.g., proteins or fragments thereof.

Any given substrate may carry one, two, four or more or more arrays disposed on a front surface of a substrate. Depending upon the use, any or all of the arrays may be the same or different from one another and each may contain multiple spots or features. A typical array may contain more than ten, more than one hundred, more than one thousand more ten thousand features, or even more than one hundred thousand features, in an area of less than 20 cm$^2$ or even less than 10 cm$^2$. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents but may not be present when, for example, photolithographic array fabrication processes are used. It will be appreciated though, that the interfeature areas, when present, could be of various sizes and configurations.

Each array may cover an area of less than 100 cm$^2$, or even less than 50 cm$^2$, 10 cm$^2$ or 1 cm$^2$. In many embodiments, the substrate carrying the one or more arrays will be shaped generally as a rectangular solid (although other shapes are possible), having a length of more than 4 mm and less than 1 m, usually more than 4 mm and less than 600 mm, more usually less than 400 mm; a width of more than 4 mm and less than 1 m, usually less than 500 mm and more usually less than 400 mm; and a thickness of more than 0.01 mm and less than 5.0 mm, usually more than 0.1 mm and less than 2 mm and more usually more than 0.2 and less than 1 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, a substrate may transmit at least 20%, or 50% (or even at least 70%, 90%, or 95%), of the illuminating light incident on the front as may be measured across the entire integrated spectrum of such illuminating light or alternatively at 532 nm or 633 nm.

An array is "addressable" when it has multiple regions of different moieties (e.g., different polynucleotide sequences) such that a region (i.e., a "feature" or "spot" of the array) at a particular predetermined location (i.e., an "address") on the array will detect a particular target or class of targets (although a feature may incidentally detect non-targets of that feature). Array features may be, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probe" may be the one which is to be evaluated by the other (thus, either one could be an unknown mixture of polynucleotides to be evaluated by binding with the other). A "scan region" refers to a contiguous (preferably, rectangular) area in which the array spots or features of interest, as defined above, are found. The scan region is that portion of the total area illuminated from which the resulting fluorescence is detected and recorded. An "array layout" refers to one or more characteristics of the features, such as feature positioning on the substrate, one or more feature dimensions, and an indication of a moiety at a given location. "Hybridizing" and "binding", with respect to polynucleotides, are used interchangeably.

"Remote location," means a location other than the location at which the array is present and hybridization occurs. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one mile, ten miles, or at least one hundred miles apart.

"Communicating" information references transmitting the data representing that information as electrical signals over a suitable communication channel (e.g., a private or public network).

"Forwarding" an item refers to any means of getting that item from one location to the next, whether by physically transporting that item or otherwise (where that is possible) and includes, at least in the case of data, physically transporting a medium carrying the data or communicating the data.

The terms "reporter," "label" "detectable reporter" and "detectable label" refer to a molecule capable of generating a measurable signal, including, but not limited to, fluorescers, and the like. The term "fluorescer" refers to a substance or a portion thereof which is capable of exhibiting fluorescence in the detectable range when excited at the appropriate wavelength. Particular examples of labels which may be used under the invention include, but are not limited to: fluorescein, 5(6)-carboxyfluorescein, Cyanine 3 (Cy3), Cyanine 5 (Cy5), rhodamine, N,N,N',N'-tetramethyl-6-carboxyrhodamine (TAMRA), dansyl, umbelliferone, Texas red, and the like.

The term "processor" refers to any hardware and/or software combination which will perform the functions required of it. For example, any processor herein may be a programmable digital microprocessor such as available in the form of a mainframe, server, or personal computer (desktop or portable) or may be incorporated into another apparatus as an integral component thereof, for example, incorporated into a fluid deposition device. Where the processor is programmable, suitable programming may be communicated from a remote location to the processor, or previously saved in a computer program product (such as a portable or fixed computer readable storage medium, whether magnetic, optical or solid state device based). For example, a magnetic or optical disk may carry the programming, and can be read by a suitable disk reader communicating with a respective processor.

DETAILED DESCRIPTION OF THE INVENTION

Methods and devices for producing a polymer at a location of a substrate are provided. In the subject methods, a fluid droplet containing a first monomer labeled with a first detectable label is deposited from a fluid deposition device onto a location of a substrate surface having a second monomer labeled with a second detectable label. The first and second detectable labels are then detected to determine any misalignment between the fluid deposition device and the location of the substrate surface during deposition. Also provided are algorithms that perform the subject methods, as well as fluid deposition devices that include the subject algorithms. The subject invention also includes arrays produced according to the subject methods and kits that include the subject arrays.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

The figures shown herein are not necessarily drawn to scale, with some components and features being exaggerated for clarity.

As summarized above, the subject invention provides methods of producing at least one polymer at a location of a substrate surface. More specifically, the subject methods involves the in situ fabrication of a polymer on a substrate surface using drop deposition from pulse jets of reagents of precursor units or residues (i.e., monomers) such that the precursor units are deposited or "layered" in a sequential fashion and bonded together to form the desired polymer, e.g., a nucleic acid or polypeptide, on the surface of the substrate. A feature of the subject methods is that two or more, sometimes all, deposited monomers include a detectable label which enables the location of the monomers on the substrate surface to be detected. This detected location may then be used to determine any misalignment between the deposition device employed to deposit the monomers and an intended deposition location on the substrate surface during deposition.

Figure 2A:
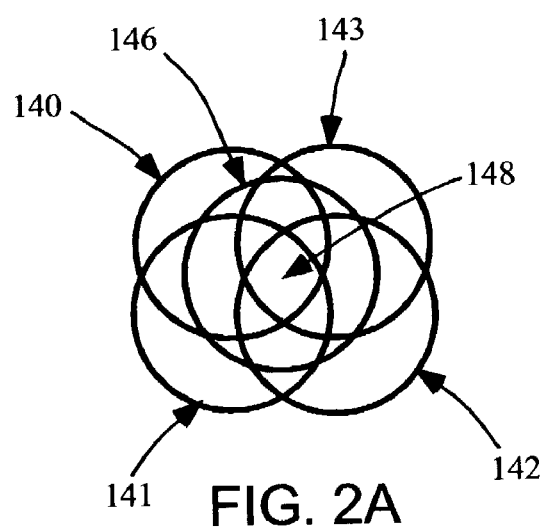
FIG. 2A shows the effects of misalignment of all four printheads of a fluid deposition device relative to each other.
Figure 2B:
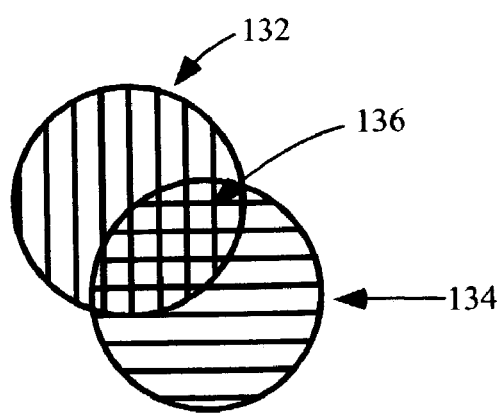
FIG. 2B shows the effects of misalignment between two printheads of a fluid deposition device relative to each other, wherein each printhead delivers two monomers different from the two monomer delivered from the other printhead.

FIG. 2A illustrates the effect of a relative misalignment with respect to the intended position 146, between four independent printheads, each of which deposits one type of nucleotide. As illustrated, first through fourth drops of reagents 140, 141, 142 and 143 are misaligned. In this example, misalignment occurs at every layer, i.e., each coupling step, such that only the region of commonality between the droplets, herein represented by reference numeral 148, contains the full length intended nucleic acid sequence while four unintended sequences are also produced adjacent thereto. It will be apparent that in practice, all combinations of nucleotides may be produced due to the misalignment, i.e., A, AT, ATC, ATCG, ATG, AC, ACG, AG, T, TC, TCG, TG, C, CG and G. In many instances, two types of phosphoramidites are delivered from a single printhead, as mentioned above. Accordingly, in this case the two phosphoramidites are aligned with respect to each other within the same printhead, but misaligned with respect to the other printhead or rather the other two phosphoramidites delivered from a second printhead. For example, G and T phosphoramidites may be delivered from a first printhead and C and A phosphoramidites may be delivered from a second printhead. Thus, G and T are aligned with respect to each other, but misaligned with respect to C and A. FIG. 2B illustrates the result of such misalignment. As shown, three regions are synthesized: a central region 136 containing the intended full length sequence containing all four intended nucleotides A, C, T and G, and two "crescent" regions of unintended sequences containing sequences of G and T only (region 132) and sequences of A and T only (region 134).

In order to automatically scan or read arrays for the presence of radioactively, fluorescently or chemiluminescently labeled targets, it is most desirable for the surfaces of the substrate to be uniformly covered with desired surface-bound polymers, e.g., the features to be uniformly covered, and for each area or feature to have a sharply defined edge. The inter-feature areas of the array should have little or no contaminants that can bind the targets, including substrate-bound polymers inadvertently synthesized along with the intended polymers synthesized within the features. Otherwise, after exposure of the array to labeled sample molecules, fuzzy, indiscrete area of the array substrate will contain labeled target molecules, making it difficult for the software used to analyze the features to select an area for signal intensity averaging. Poorly averaged signal intensity may significantly lower confidence in resulting measurements, and may even produce incorrect results.

The subject methods may be employed to produce a variety of polymers, where polymers of interest include: polypeptides, proteins, polynucleic acids or mimetics thereof, e.g., peptide nucleic acids and the like; polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric. The methods described herein are particularly useful for producing an array of polymers, e.g., a nucleic acid array, as will be described in greater detail below. For example two or more polymers may be produced at two distinct locations on a substrate, where the polymers may be the same or may be different.

The subject invention will be described herein primarily with reference to producing one or more nucleic acids on a substrate surface for ease of description only and is in no way intended to limit the scope of the invention. However, it will be apparent Where the polymer(s) produced are nucleic acids, such are typically produced according to the subject invention by synthesizing nucleic acid polymers using sequential phosphoramidite addition. Phosphoramidite based chemical synthesis of nucleic acids is well known to those of skill in the art, being reviewed above and in U.S. Pat. No. 4,415,732, the disclosure of which is herein incorporated by reference. Generally, in phosphoramidite synthesis of oligonucleotides, deoxynucleoside phosphoramidites are used as monomers for the step-wise synthesis of oligonucleotides on a substrate surface. Accordingly, the deoxynucleosides include adenosine, guanosine, cytidine and thymidine, which are added sequentially as fluid droplets from a fluid deposition device to a substrate surface such that each sequential monomer is added to the growing oligonucleotide polymer attached to the substrate surface. In further describing the subject invention, a summary of a general phosphoramidite synthesis protocol is generally described to provide a proper foundation for the subject invention. Next, the subject methods will be described, as well as algorithms that perform the subject methods and arrays produced according to the subject methods. Finally, kits that include the subject arrays are described.

General Phosphoramidite Synthesis Protocol

Figure 3:
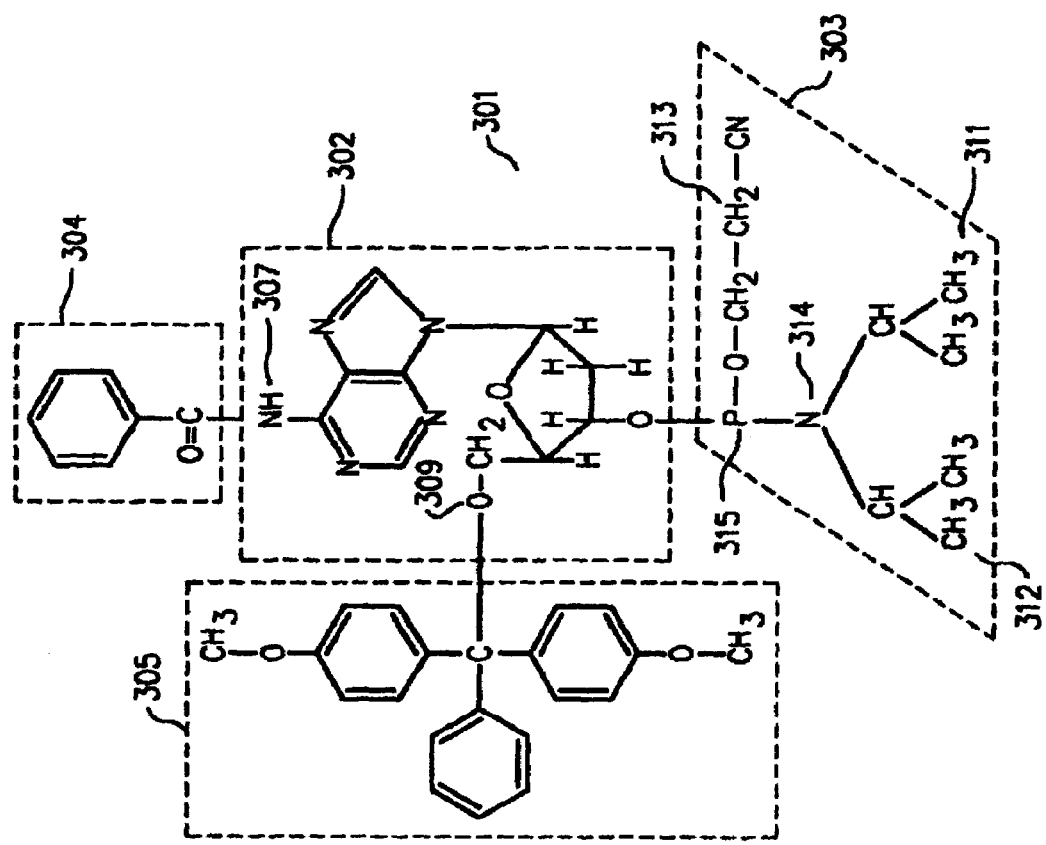
FIG. 3 illustrates the deoxynucleoside phosphoramidite 5'-Dimethoxytrityl-N-benzoyl-2'-deoxyAdenosine, 3'-[(O-cyanoethyl)-(N,N-diisopropyl)]-phosphoramidite.

FIG. 3 illustrates the deoxynucdeoshie phosphoramidite 5'-Dimethoxytrityl-N-benzoyl-2'-deoxyAdenosine, 3'-[(O-cyanoethyl)-(N,N-diisopropyl)]-phosphoramidite. This monomer 301 is composed of four different subcomponent groups 302-305, enclosed in FIG. 2 within dashed lines. The first subcomponent group 302 is a deoxynucleoside In FIG. 3, the deoxynucleoside illustrated is adenosine. As mentioned above, other deoxynucleoside phosphoramidites used in the synthesis of oligonuoleotides contain guanosine, cytidine, and thymidine in place of the adenosine 302 shown in FIG. 3. A benzoyl group 304 is linked through an amide bond 307 to $N^6$ of the adenosine group 302. This benzoyl group protects the primary amine of the adenosine group from reacting with the phosphoramidite group of a second deoxynucleoside phosphoramidite. The primary amines of guanosine and cytidine are similarly protected in the other deoxynucleoside phosphoramidites. Different types of protecting groups are available, including, for example, acetyl or isobutyryl groups. A dimethoxytrityl ("DMTr") group 305 is linked to the 5' end of the deoxynucleoside group in order to protect the 5'-hydroxyl group 309 of the deoxynucleoside from reacting with the phosphoramidite group of another deoxyphosphoramidite. Finally, a phosphoramidite group 303 is linked to the 3' end of the adenosine group 302. A variety of different phosphoramidite groups may be employed in which different types of alkyl groups may be substituted for the isopropyl groups 311-312 linked to the amine nitrogen atom 314 of the phosphoramidite group 303 and the cyanoethyl group 313 linked via a phosphite ester bond to the phosphorous atom 315 of the phosphoramidite group 303.

Figure 4A:
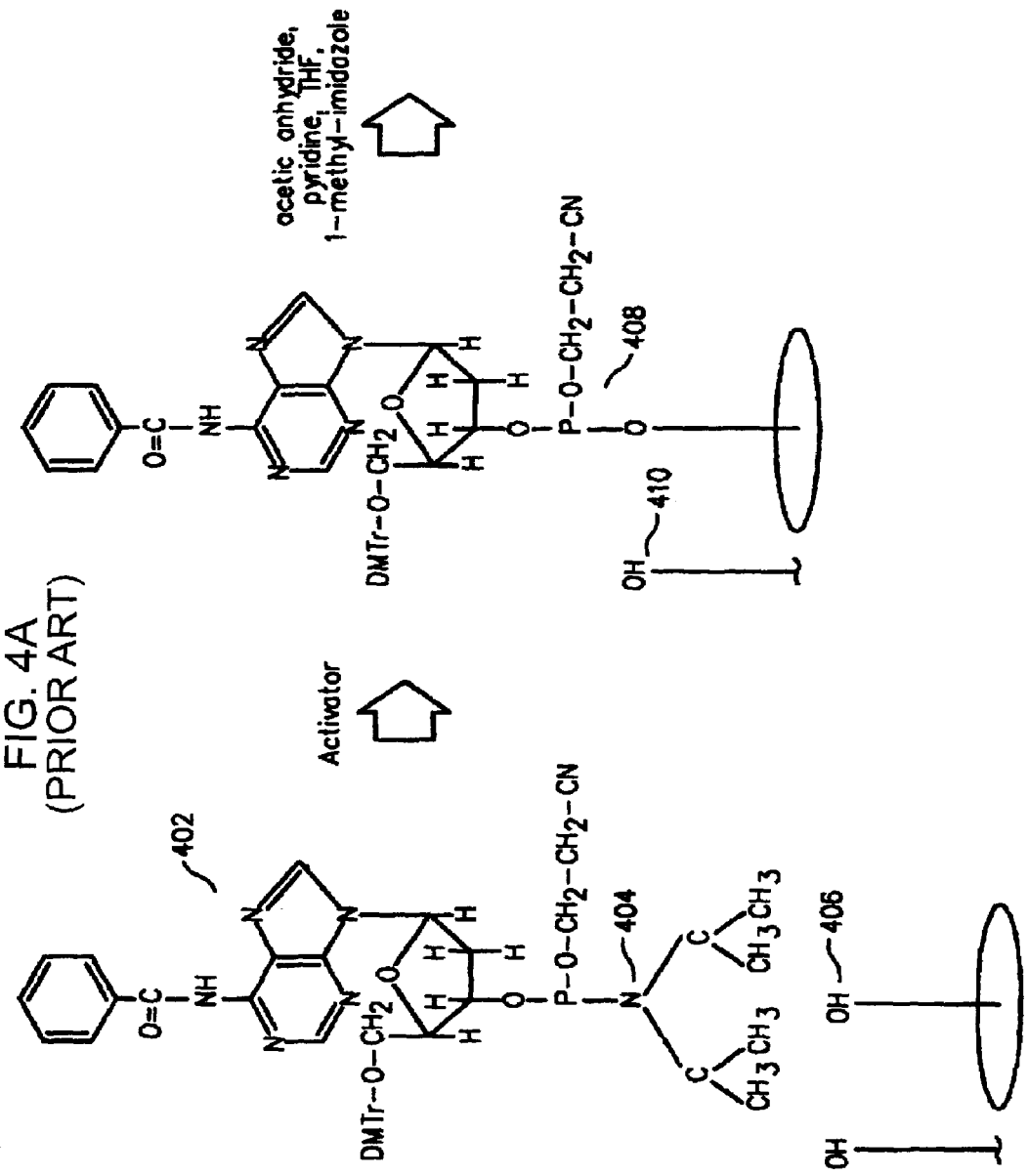

FIGS. 4A and 4B illustrate the chemical steps, as are known in the art, employed to link the first protected deoxynucleoside phosphoramidite monomer to a free hydroxyl group on the surface of the substrate. A solution containing a protected deoxynucleoside phosphoramidite 402 and an activator, such as tetrazole, benzoimidazolium triflate ("BZT"), S-ethyl tetrazole, and dicyanoimidazole, is applied to the surface of the substrate that has been chemically prepared to present reactive functional groups, herein shown as free hydroxyl groups 406. The activators tetrazole, BZT, S-ethyl tetrazole, and dicyanoimidazole are acids that protonate the amine nitrogen 404 of the phosphoramidite group of the deoxynucleoside phosphoramidite 402. A free hydroxyl group 406 on the surface of the substrate displaces the protonated secondary amine group of the phosphoramidite group by nucleophilic substitution and results in the protected deoxynucleoside covalently bound to the substrate via a phosphite triester group 408. Diisopropyl amine is released into solution. After a wash step, in which unreacted deoxynucleoside phosphoramidites, diisopropyl amine, and activator are removed, free hydroxyl groups of the substrate, particularly free hydroxyl groups of the inter-cell regions of the substrate 410, are optionally acetylated 412 by application of a solution of CAP A, comprising acetic anhydride, pyridine or 2,6-lutidine (2,6-dimethylpyridine), and tetrahydrofuran ("THF"), and CAP B, comprising 1-methyl-imidazole in THF. After a wash step, in which the CAP A/CAP B solution is removed, the phosphite triester group is oxidized by the addition of iodine in THF, pyridine, and water to form a phosphotriester group 414.

Figure 5A:
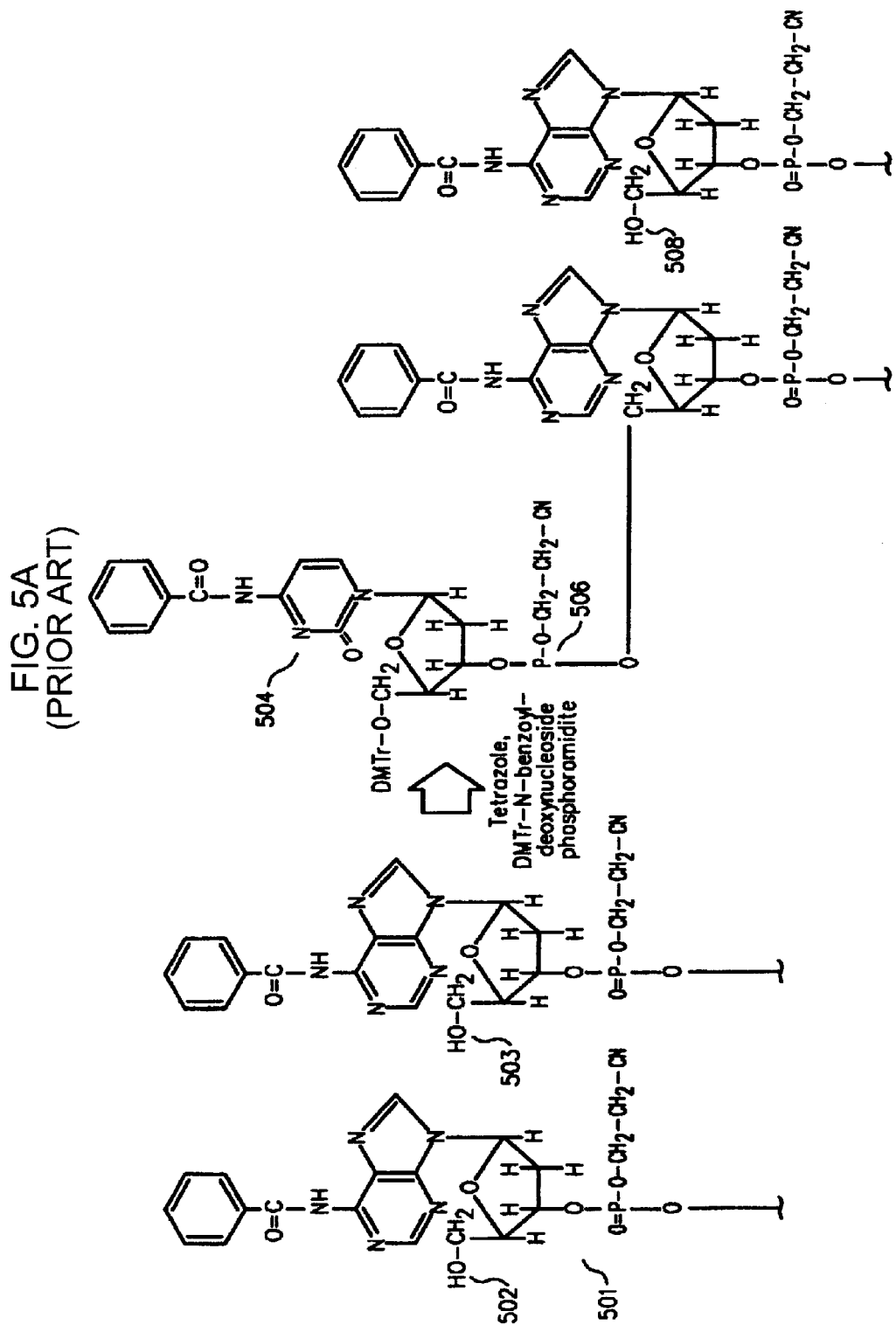
FIGS. 5A and 5B illustrate the addition of a deoxynucleoside phosphoramidite monomer to a growing oligonucleotide polymer bound to the surface of a substrate.
Figure 5B:
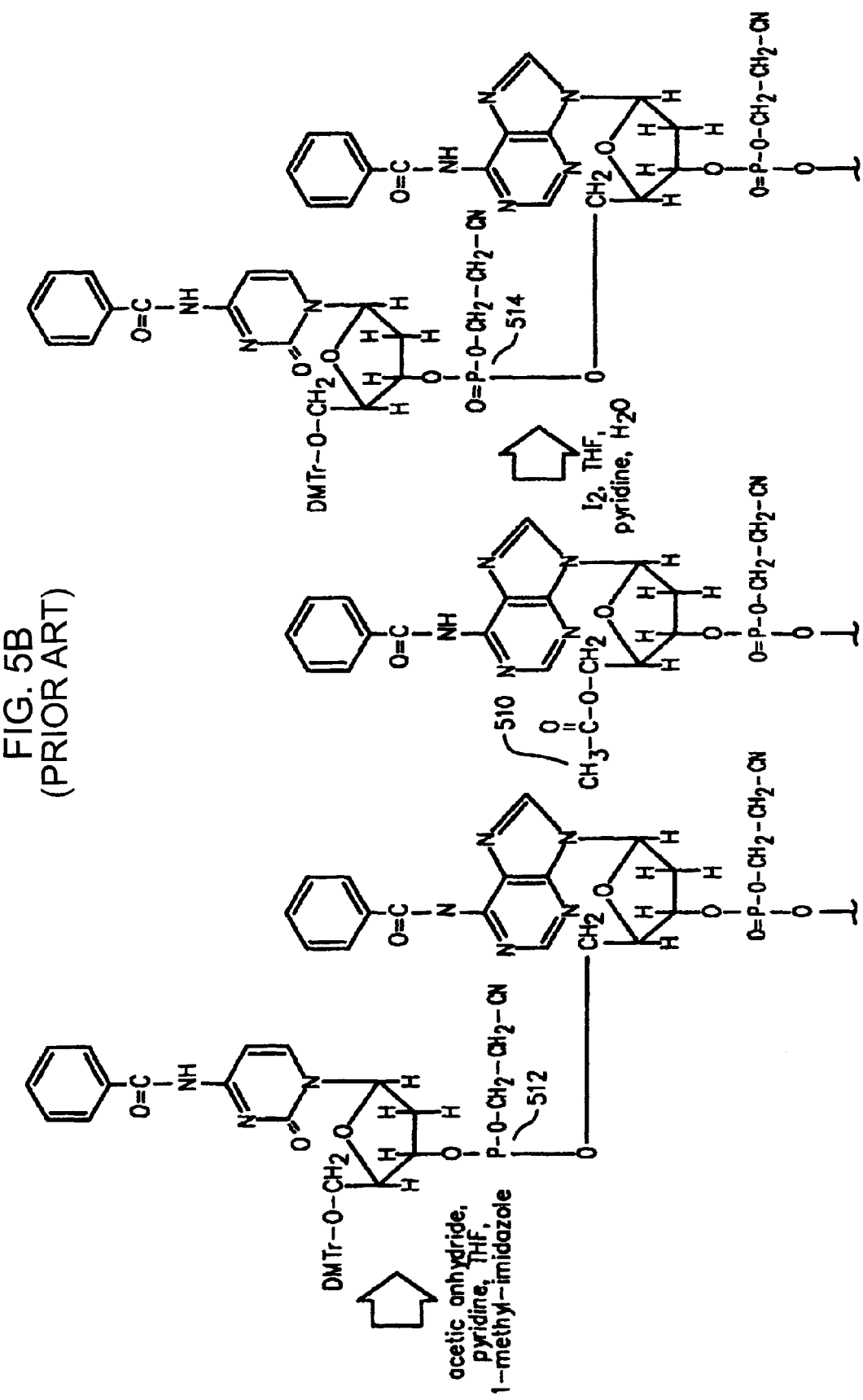

FIGS. 5A and 5B illustrate the addition of a deoxyphosphoramidite monomer to a growing oligonucleotide polymer 501 attached to the surface of the substrate, as is known in the art. After any unreacted reagents from previous synthetic steps are removed by washing, the DMTr protecting groups of the 5'-terminal nucleosides of the growing oligonucleotides are removed by treatment with acid to produce a free 5'-hydroxyl group 502-503. Next, a protected deoxynucleoside phosphoramidite (DMTr-N-benzoyl-deoxyCytidine phosphoramidite in the figure) in solution with tetrazole, or any other known activator, is applied to the substrate-bound oligonucleotide and reacts with the 5' hydroxyl of the oligonucleotide to covalently link the protected deoxynucleoside 504 to the 5' end of the oligonucleotide via a phosphite triester group 506. After excess, unreacted protected deoxynucleoside phosphoramidite and activator are removed by washing, any unreacted 5'-hydroxyl groups 508 of substrate-bound oligonucleotides are acetylated 510 by application of a CAP A (tetrahydrofuran ("THF"), pyridine, and acetic anhydride)/CAP B (methylimidazole in THF) solution. This step may be necessary because the previous oligonucleotide elongation reaction does not proceed to 100% completion, and it may be desirable to terminate any unreacted nucleotides by acetylation so that oligonucleotides with incorrect sequences are not produced in subsequent synthetic steps. After the CAP A/CAP B solution is removed by washing with acetonitrile, the phosphite triester group 512 is oxidized to a phosphotriester group 514 by the addition of $I_2$, THF, pyridine, and $H_2O$. The steps illustrated in FIGS. 5A and 5B are repeated to add each additional deoxynucleoside to the 5' end of the growing oligonucleotide.

Methods

In accordance with the subject invention, two or more precursor molecules, i.e., monomers or residues, that are employed to make-up a desired polymer have the ability to produce a detectable signal. That is, two or monomers are labeled, i.e., conjugated or otherwise bound or associated, to or with a detectable molecule, e.g., an optically detectable molecule, such as a fluorescent label.

Where the label is a fluorescent compound or agent, i.e., the fluorescent label, it is capable of emitting radiation (visible or invisible) upon stimulation by radiation of a wavelength different from that of the emitted radiation, or through other manners of excitation, e.g., chemical or non-radiative energy transfer. Where the detectable label employed includes a fluorescent label, the radiation or light absorbed and emitted from the fluorescent agent, i.e., the response radiation, (the wavelength of the response radiation) is chosen to be in the portion of the electromagnetic spectrum to which the detecting optical apparatus such as an array optical reader or scanner is sensitive. Usually, the light absorbed and emitted from the fluorescent agent is in the ultraviolet, visible or infrared regions, but may include other wavelengths as well as appropriate.

The particular fluorescent agent(s) employed may vary depending on a variety of factors, where such factors include the particular optical scanner used to detect the fluorescence, the excitation and/or response wavelength, and the like. The fluorophoric moieties or fluorophores of the fluorescent agents may be cyclic or polycyclic, particularly polycyclic, aromatic compounds having at least two rings, usually at least three rings and not more than six rings, more usually not more than five rings, where at least two of the rings are fused and in certain embodiments at least three of the rings are fused, where usually not more than four of the rings are fused. The aromatic compounds may be carbocyclic or heterocyclic, particularly having from one to three, more usually one to two nitrogen atoms as heteroannular atoms. Other heteroannular atoms may include oxygen and sulfur (chalcogen).

The rings may be substituted by a wide variety of substituents, which substituents may include alkyl groups of from one to six carbon atoms, usually from one to two carbon atoms, oxy, which includes hydroxy, alkoxy and carboxy ester, generally of from one to four carbon atoms, amino, including mono- and disubstituted amino, particularly mono- and dialkyl amino, of from 0 to 8, usually 0 to 6 carbon atoms, thio, particularly alkylthio from 1 to 4, usually 1 to 2 carbon atoms, sulfonate, including alkylsulfonate and sulfonic acid, cyano, non-oxo-carbonyl, such as carboxy and derivatives thereof, particularly carboxamide or carboxyalkyl, of from 1 to 8 or 1 to 6 carbon atoms, usually 2 to 6 carbon atoms and more usually 2 to 4 carbon atoms, oxo-carbonyl or acyl, generally from 1 to 4 carbon atoms, halo, particularly of atomic number 9 to 35, etc.

Specific fluorescent agents of interest include, but are not limited to: xanthene dyes, e.g., fluorescein and rhodamine dyes, such as fluorescein isothiocyanate (FITC), 2-[ethylamino)-3-(ethylimino)-2-7-dimethyl-3H-xanthen-9-yl]benzoic acid ethyl ester monohydrochloride (R6G)(emits a response radiation in the wavelength that ranges from about 500 to 560 nm), 1,1,3,3,3',3'-Hexamethylindodicarbocyanine iodide (HIDC) (emits a response radiation in the wavelength that ranged from about 600 to 660 nm), 6-carboxyfluorescein (commonly known by the abbreviations FAM and F), 6-carboxy-2,4,7,4,7-hexachlorofluorescein (HEX), 6-carboxy-4',5'-dichloro-2',7'-dimethoxyfluorescein (JOE or J), N,N,N',N'-tetramethyl-6-carboxyrhodamine (TAMRA or T), 6-carboxy-X-rhodamine (ROX or R), 5-carboxyrhodamine-6G (R6G5 or G5), 6-carboxyrhodamine-6G (R6G6 or G6), and rhodamine 110; cyanine dyes, e.g. Cy3, Cy5 and Cy7 dyes; coumarins, e.g., umbelliferone; benzimide dyes, e.g. Hoechst 33258; phenanthridine dyes, e.g. Texas Red; ethidium dyes; acridine dyes; carbazole dyes; phenoxazine dyes; porphyrin dyes; polymethine dyes, e.g. cyanine dyes such as Cy3 (emits a response radiation in the wavelength that ranges from about 540 to 580 nm), Cy5 (emits a response radiation in the wavelength that ranges from about 640 to 680 nm), etc; BODIPY dyes and quinoline dyes. Specific fluorophores of interest include: Pyrene, Coumarin, Diethylaminocoumarin, FAM, Fluorescein Chlorotriazinyl, Fluorescein, R110, Eosin, JOE, R6G, HIDC, Tetramethylrhodamine, TAMRA, Lissamine, ROX, Napthofluorescein, Texas Red, Napthofluorescein, Cy3, and Cy5, etc.

As described above, the subject monomers are associated with labels that are distinguishable from each other upon detection. As such, a first monomer or first residue is labeled with a first detectable label and a second monomer or second detectable label is labeled with a second label, i.e., a label that is distinguishable from the first detectable label upon detection thereof. The first and second monomers may be the same or may be different, as long as the labels associated therewith are distinguishable from one another. By distinguishable it is meant that the emitted response radiations or emission spectrums produced by the respective labels are distinguishable. In other words, the maximum wavelengths or peaks of the emitted radiation responses from the respective detectable labels will vary. The difference between the wavelengths of the distinguishable labels will depend on the quality of the scanner being employed and the filters used, as well as the particular labels or dyes chosen. Typically, a label is distinguishable from another label if less than about 5%, and usually less than about 1%, of the emitted radiation of the first distinguishable label is detected or recorded as the emitted radiation of the second distinguishable label by the detecting device. In certain embodiments, the maximum wavelengths or peaks of the emitted responses of two distinguishable labels will differ by about 60 nm to about 100 nm or more.

Any combination of suitable detectable agents may be used with the only limitation being that the fluorescent agents are distinguishable from each other upon detection, where particular combinations of interest include fluorescein dyes and cyanine dyes; R6G, i.e., 2-[ethylamino)-3-(ethylimino)-2-7-dimethyl-3H-xanthen-9-yl] benzoic acid ethyl ester monohydrochloride and HIDC, i.e., 1,1,3,3,3',3'-Hexamethylindodicarbocyanine iodide; Cy3 (Indocarbocyanine) and Cy5 (Indodicarbocyanine); TAMRA and Cy5; and other suitable combinations, where combinations of green and red dyes are of particular interest.

For example, a first monomer may be labeled with a fluoroscein dye and a second monomer added to the first monomer may be labeled with cyanine dye. As described in greater detail below, the first and second monomers may be bonded directly to each other or may have one or more labeled and/or unlabeled intervening monomers therebetween. In those embodiments having more than two labeled monomers, all labels may be different or some or all may be the same such that the detectable labels are distinguishable by a predetermined pattern or order of detectable labels such as the order of fluorescent dyes employed. As such, continuing with the example provided above, a third monomer added to the first and second monomers may be labeled with a dye other than the particular fluoroscein and cyanine dyes employed previously, or may be labeled with, for example, the same label employed for the first monomer, i.e., the same fluoroscein dye, such that the fluorescent labels are alternated (e.g., every other monomer) in a predictable manner to maintain distinguishability amongst the various monomers and labels. Accordingly, a fourth added monomer may be labeled with a dye other than the particular fluoroscein and cyanine dyes employed previously, or may be labeled with, for example, the same label employed for the second monomer, i.e., the same cyanine dye, such that a pattern of alternating distinguishable first and second detectable labels is employed.

As described above, once the monomers are appropriately labeled, they are employed to produce at least one polymer on a substrate surface in the following manner. First, a substrate is provided upon which one or more polymers may be produced, where a variety of solid supports or substrates may be used. The substrate may be selected from a wide variety of materials including, but not limited to, natural polymeric materials, particularly cellulosic materials and materials derived from cellulose, such as fiber containing papers, e.g., filter paper, chromatographic paper, etc., synthetic or modified naturally occurring polymers, such as nitrocellulose, cellulose acetate, poly (vinyl chloride), polyamides, polyacrylamide, polyacrylate, polymethacrylate, polyesters, polyolefins, polyethylene, polytetrafluoroethylene, polypropylene, poly (4-methylbutene), polystyrene, poly(ethylene terephthalate), nylon, poly(vinyl butyrate), cross linked dextran, agarose, etc.; either used by themselves or in conjunction with other materials; fused silica (e.g., glass), bioglass, silicon chips, ceramics, metals, and the like. For example, substrates may include polystyrene, to which short oligophosphodiesters, e.g., oligonucleotides ranging from about 5 to about 50 nucleotides in length, may readily be covalently attached (Letsinger et al. (1975) Nucl. Acids Res. 2:773-786), as well as polyacrylamide (Gait et al. (1982) Nucl. Acids Res. 10:6243-6254), silica (Caruthers et al. (1980) Tetrahedron Letters 21:719-722), and controlled-pore glass (Sproat et al. (1983) Tetrahedron Letters 24:5771-5774). Additionally, the substrate can be hydrophilic or capable of being rendered hydrophilic.

Suitable substrates may exist, for example, as sheets, tubing, spheres, containers, pads, slices, films, plates, slides, strips, disks, etc. The substrate is usually flat, but may take on alternative surface configurations. The substrate can be a flat glass substrate, such as a conventional microscope glass slide, a cover slip and the like. Substrates of interest include surface-derivatized glass or silica, or polymer membrane surfaces, as described in Maskos, U. et al., Nucleic Acids Res, 1992, 20:1679-84 and Southern, E. M. et al., Nucleic acids Res, 1994, 22:1368-73.

Once a suitable substrate is provided, the subject monomers are deposited using a fluid deposition device utilizing fluid deposition technology, e.g., using a pulse-jet fluid deposition device as is known in the art, to a location on the surface of the substrate in a sequential or step-wise fashion to produce a polymer. The detectable labels of the monomers enable any misalignment of the deposited monomers, relative to each other, to be easily detected. As noted above, this misalignment is a result of misalignment between the fluid deposition device used to deposit the labeled monomers and the intended deposition location on the substrate.

More specifically, in certain manufacturing protocols, e.g., utilizing pulse jet fluid technology to synthesize polymers on a substrate surface in situ, one or more unintended or intermediate polymeric sequences may be synthesized on the substrate surface along with the intended full length polymer(s). This may be caused by the misalignment of the stage, i.e., the XYZ stage, upon which the substrate is positioned during the deposition process and/or the misalignment of the alignment system of the fluid deposition device and/or the misalignment of the pulse jet printheads relative to each other. Misalignment may occur during or between cycles of an in situ synthesis process. In situ synthesis processes are described in detail in, for example, U.S. Pat. No. 6,222,030, U.S. Pat. No. 6,242,266; U.S. Pat. No. 6,300,137; U.S. Pat. No. 6,232,072; U.S. Pat. No. 6,180,351; U.S. Pat. No. 6,171,797; U.S. Pat. No. 6,323,043; U.S. patent application Ser. No. 09/302,898 filed Apr. 30, 1999 by Caren et al., and the references cited therein, herein incorporated by reference. Typically, the misalignment between pulse jet printheads relative to each other may be attributed to misalignment between one or more nozzles of a printhead relative to one or more corresponding nozzles of another printhead. However, regardless of the cause of any printhead misalignment, in further describing the subject invention, the general term "printhead misalignment" will primarily be used to encompass all printhead misalignment, regardless of the source or cause, whether it be nozzle misalignment, misalignment of the carriage that moves a printhead, etc.

As described above, in accordance with the subject invention a series of monomers, e.g., deoxynucleoside phosphoramidite solution droplets, are applied to a particular location on a substrate surface using a fluid deposition device, e.g., deposited to a particular feature area or spot of a substrate surface, in order to synthesize a particular polymer, e.g., a particular oligonucleotide or particular polypeptide. Of particular interest in many embodiments is the use of pulse-jet deposition devices to deposit the droplets. The first droplet, containing the first deoxynucleoside phosphoramidite that will end up as the 3'-terminal nucleoside within a synthesized oligonucleotide, defines the position on the substrate, e.g., the position of the feature, of the intended synthesized oligonucleotide. Subsequent droplets, each having a deoxynucleoside phosphoramidite, are targeted to the same, precise location as the first droplet.

However, due to misalignment or misregistration between the fluid deposition device and the desired targeted location, subsequent droplets may be deposited at locations offset from the location of the application of the first droplet. During an array assay such as a hybridization assay, the unintended or intermediate sequences produced due to this misregistration may result in binding of labeled target molecules present in the sample to these unintended sequences producing unwanted binding events, as described above, which may compromise the array assay results.

FIGS. 6A-6F illustrate the steps for producing an oligonucleotide on a substrate surface using the subject methods such that any misalignment or misregistration may be detected and, if desired, corrected for subsequently added droplets. Oligonucleotides are commonly represented by strings of the upper case letters A, T, C and G, that represent adenosine, thymidine, cytosine and guanosine subunits or monomers within the oligonucleotide, respectively. As will be apparent to one of skill in the art, any combination of A, T, C and G nucleosides may be employed in accordance with the subject invention because it is the dyes employed that are distinguishable from one another and thus are employed to determine any misalignment. For the sake of convenience, the subject invention will be described primarily in reference to T nucleosides, where such description is in no way intended to limit the scope of the invention. As noted above, the monomers employed to in accordance with the subject methods may be the same or may be different.

Figure 6A:
FIGS. 6A-6F illustrate the steps for producing an oligonucleotide on a substrate surface using the subject methods such that any misalignment or misregistration may be detected and, if desired, corrected prior to adding any subsequent droplets.
Figure 6B:
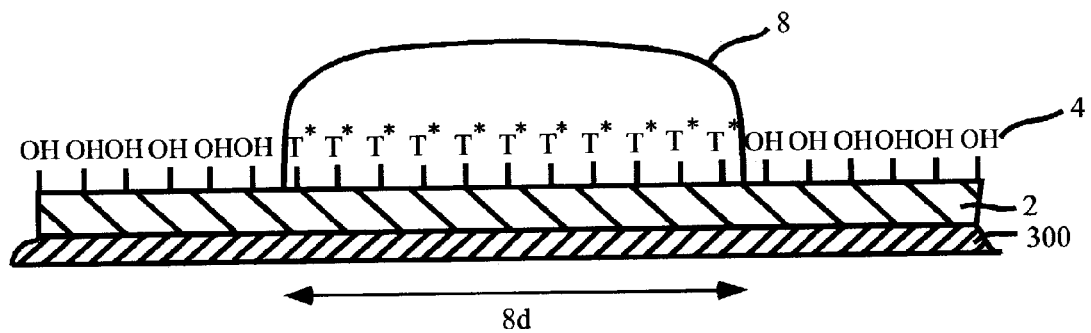
Figure 6C:
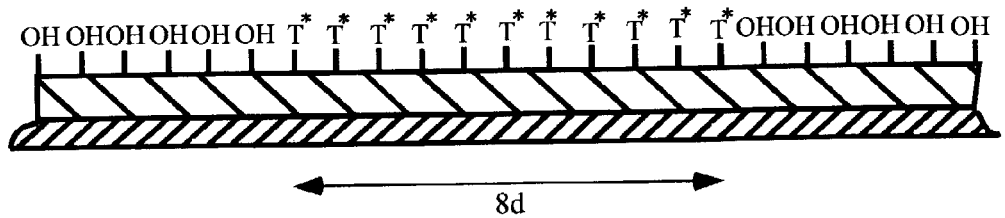

FIG. 6A illustrates, in cross section, a substrate 2 positioned on a stage such as an XYZ stage 300, i.e., a stage capable of moving in one or all of X, Y, Z directions or planes, wherein the surface of substrate 2 has been prepared to present reactive functional groups, in this case hydroxyl groups 4, at the surface that will serve as starting points or anchors to which synthesized biopolymers will be bound. In accordance with the subject invention, the next step is to deposit a fluid droplet containing a monomer having a detectable label to the substrate surface, as shown in FIG. 6B, for example from a first printhead. The labeled T phosphoramidite monomer containing droplet 8 is shown positioned on the surface of the substrate such that $8_d$ illustrates the diameter of droplet 8 spread out on the substrate surface, wherein this particular detectable label is represented as an asterisk such that the first labeled monomer is represented as T*. FIG. 6C shows the result of this step.

Figure 6D:
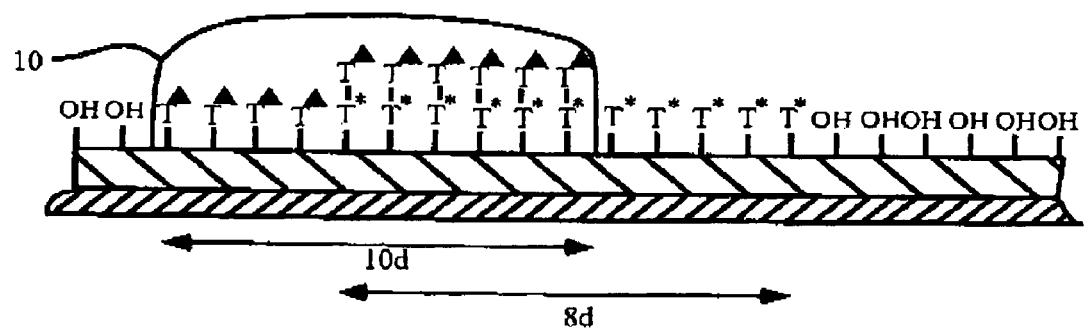
Figure 6E:
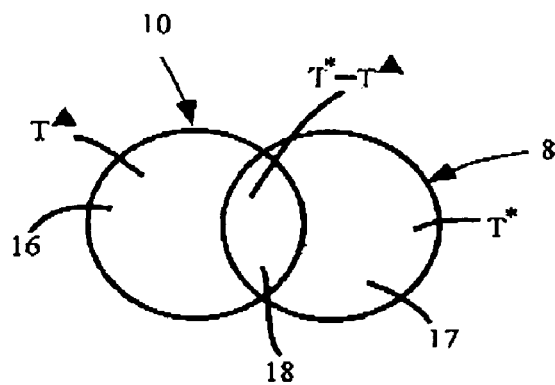
Figure 6F:
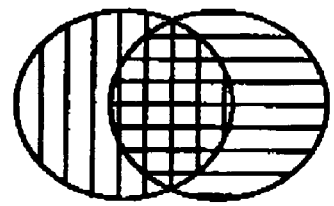

FIG. 6D shows the deposition of a second detectably labeled protected nucleoside phosphoramidite droplet 10 to the substrate surface following a deprotection step (not illustrated), for example from a second printhead, where the diameter of droplet 10 is represented by $10_d$ and second detectable label is represented by a darkened triangle such that the second labeled monomer is represented as T▲. Although the intended location of second droplet 10 is the precise location of first droplet 8, due to misalignment between the fluid deposition device and the intended location, the second droplet has been applied to a position offset or left of the first droplet, i.e., it is misaligned with respect to the first droplet. A top down view of this particular area of the substrate surface is shown in FIG. 6E. As a result of misalignment, this particular area or feature of the substrate surface now has regions of the substrate surface with unintended bound monomers. In the central, core region 18 is the intended sequence such that second labeled phosphoramidite monomers have been added to the first labeled monomers bound to the substrate surface to form nascent T*-T▲ dinucleotides. Due to misalignment, a second region 16, outside the core region, has been unintentionally formed that includes surface-bound labeled T▲ monomers. Also due to misalignment, a third region 17 has been unintentionally formed that includes surface-bound T* molecules that are unreacted with T▲ molecules. Each region may also include some or all of free OH groups.

In conventional protocols, any such misalignment is undetectable, particularly during the synthesis process. It will be apparent that detection of such misalignment either during or after oligonucleotide synthesis provides useful information. For example, if misalignment is detected during synthesis, it may be corrected, i.e., the component or feature causing the misalignment may be adjusted using a feedback mechanism such as an algorithm as described below, such that it is not perpetuated throughout the synthesis process for subsequently added monomers. If misalignment is detected after synthesis, such information maybe useful in assay analysis to account or correct for the misalignment, e.g., a correction factor may be employed, reagent concentrations may be adjusted, etc. For example, in those instances where misalignment is detected after synthesis, the synthesized oligonucleotides may be employed in an array assay to provide array assay results. These results may be erroneous or otherwise require adjustment or correction due to the misalignment. Accordingly, in analyzing these results, a correction factor, e.g., a mathematical value, may be employed to provide corrected results that are analogous to results obtained without misalignment, i.e., analogous to results obtained had there been no misalignment. In certain embodiments, in those instances where misalignment is detected after synthesis, the synthesized oligonucleotides may be employed in an array assay to provide array assay results and the correction may include adjusting or altering the reagents employed in the array assay such that results of an array assay using the synthesized oligonucleotides are analogous to results obtained without misalignment, i.e., analogous to results obtained had there been no misalignment.

Thus, in accordance with the subject invention, because some or all of the deposited monomers have been labeled with distinguishable labels, the misalignment can be easily detected by an appropriate detector device such as an optical detector capable of fluorescent scanning of the solid support, as well as the extent of the shift or rather the location of the misaligned droplet(s) relative to other labeled droplets. As shown, in FIG. 6F, the three regions 16, 17 and 18 will produce three signals, all of which are distinguishable from one another. That is, region 16, having a detectable label represented by longitudinal lines will provide a first signal, region 17, having a detectable label represented by horizontal lines will provide a second signal and central region 18 will provide a third signal represented by the overlap of the lines or rather the combination of the first and second labels corresponding to the first and second monomers, respectively. The above-described steps may be repeated one or more times, e.g., with the same or different monomers and/or labels.

In certain embodiments, the polymers produced according to the subject invention include more than two monomers and as such the above steps are repeated a number of times with additional labeled and/or unlabeled monomers until the one or more desired polymers on the substrate surface are produced. As such, each monomer may include a detectable label, or only some of the monomers may include a detectable label. Typically, the length of a biopolymer produced according to the subject methods ranges from about 2 nt to about 500 nt, usually from about 2 nt to about 200 nt and more usually from about 2 to about 100 nt, e.g., about 5 nt, about 10 nt, about 15 nt, about 20 nt, etc., up to and including about 100 nt. In certain embodiments biopolymers having lengths greater than the above-described lengths may be produced according to the subject invention.

It will be apparent that any labeling protocol may be employed to determine misalignment between any two or more fluid droplets, where the fluid droplets of interest may be directly adjacent one another, i.e., directly bonded to each other, or may be separated from each other by one or more monomers, i.e., not directly bonded to each other, where any intervening monomers may be labeled and/or unlabeled. For example, in certain embodiments, only the first and last deposited monomers may be labeled, where these monomers may be separated from each other by one or more other monomers, i.e., the first and last labeled monomers are not bonded directly to each other. This labeling protocol enables detection of any misalignment that occurs from the first step of the oligonucleotide synthesis relative to the end or last step of the oligonucleotide synthesis. In certain embodiments, only a particular monomer may be labeled, e.g., only T monomers, or only A and G monomers, etc., are labeled, for example to detect relative misalignment between certain printheads (e.g., between nozzles, etc.). As will be obvious, a variety of labeling protocols and permutations may be employed. For example, every second monomer may be labeled, or every third monomer may be labeled, or labeling may be random, etc.

Figure 7A:
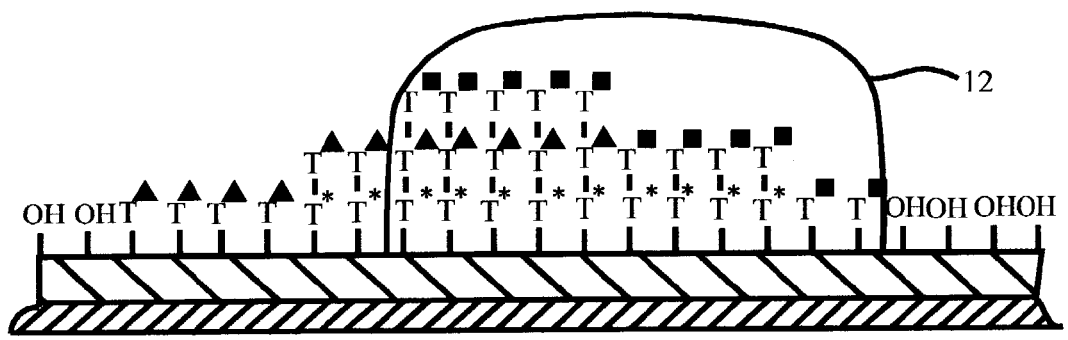
FIGS. 7A-7C illustrate the addition of a third protected labeled nucleoside phosphoramidite droplet to the surface of the substrate of FIG. 6D.

In certain embodiments, substantially all, including all, of the nucleotides include a detectable label, where some or all detectable labels may be the same or different. In this manner, the alignment of each subsequent droplet relative to one or more previously deposited droplets may be determined, if desired. FIG. 7A shows the addition of a third protected labeled nucleoside phosphoramidite droplet 12 to the surface of the substrate shown in FIG. 7D. The third monomer is a thymidine monomer and has third detectable label represented by a darkened square such that the third labeled monomer is represented as T$^■$, which third label is distinguishable from the first and second labels upon detection. In this particular embodiment, the third droplet is misaligned. Droplet 12 having protected thymidine phosphoramidite and diameter $12_d$, is positioned to the right of first droplet 8, i.e., positioned to the right of the intended target location. Accordingly, intended nascent T*-T$^{▲-T570}$ trinucleotides, as well as unintended T*-T$^▲$ and T*-T$^■$ dinucleotides and unintended T*, T$^▲$ and T$^■$ nucleotides bound directly to linker molecules are now present on the substrate surface (other permutations may be present as well (not shown) such as T$^{▲-7■}$). In this manner, determination of the third droplet's position relative to other distinguishably labeled droplets may be determined by detecting the labels in a manner analogous to that described above.

Figure 7B:
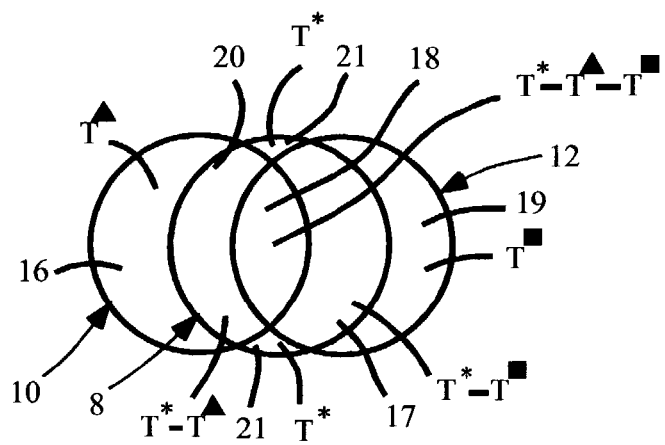
Figure 7C:
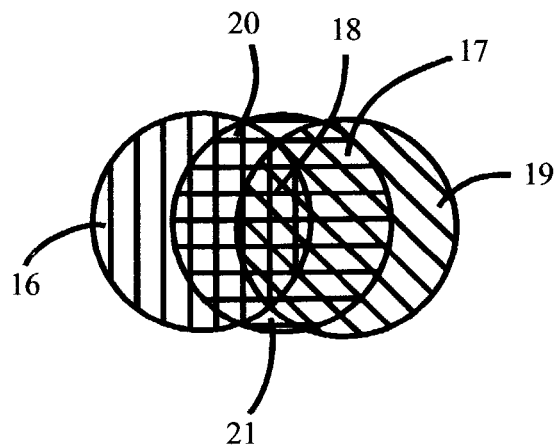

This misalignment may be better viewed in the top down view of this particular area of the substrate surface shown in FIG. 7B. As a result of this misalignment, core region 18 includes the intended polymer sequence such that a third step includes depositing a third phosphoramidite monomer (T$^■$) to the surface bound dinucleotide T*-T$^▲$. As shown, additional unintentional regions 16, 17, 19, 20 and 21 that include labeled T$^▲$, T*-T$^■$, T$^■$, T*-T$^▲$ and T*, respectively, have been produced on the substrate surface as well as the core intended region. As shown in FIG. 7C, all of the regions will produce different signals, represented by the pattern of various lines throughout, owing to the various labels and combinations thereof, where all such signals are distinguishable from one another upon detection.

As mentioned above, in certain embodiments the subject polymers may include more than two monomers. In these embodiments, the labeling of the monomers may be chosen according to the particular task at hand and information desired. For example, as described above, in certain embodiment substantially all, including all, of the monomers are labeled with a different label, i.e., a label that is distinguishable from the other labels. In other embodiments, some of the labels may be the same. For example, the above described in situ synthesis method of the subject invention may be used to produce a polymer having more than two deposited monomers, where each of the monomers, except the last monomer deposited, has the same label, i.e., has a first detectable label, and the last monomer has a label that is distinguishable from the previously deposited first label, i.e., the last monomer has a second detectable label. The substrate surface is then scanned and the first and second labels are detected. In this manner, detection of the labels will provide the relative shift or misalignment of each monomer droplet with respect to the last deposited monomer droplet.

In many embodiments the subject invention also includes producing more than one polymer on the substrate surface. In many embodiments two or more distinct polymers differing by monomeric sequence and/or labeling protocol are produced on a substrate surface, where the two polymers are spatially separated and are positioned at known locations on the substrate surface in the form of an "array" or pattern, as will be described in greater detail below. Each distinct polymeric sequence of the array is typically present as a composition of multiple copies of the polymer on the substrate surface, e.g., as a spot or feature on the surface of the substrate. In accordance with the subject invention, by choosing which sites are contacted with which labeled activated nucleotides, e.g., A, G, C and T or all T nucleotides having different distinguishable labels, an array having polymers of desired sequence and spatial location is readily achieved. That is, a particular deoxynucleoside phosphoramidite reactant having a particular distinguishable label may be added to each area or feature during each synthetic cycle. In this manner, each new layer of the synthesis cycle can be compared to a previous layer, and/or to the first or last layer, where a plurality of comparisons may be performed due to the multiple features. For example, a variety of different printhead combinations may be evaluated on the same substrate, e.g., at the same time, for any misalignment between the printheads.

For example, labeled, protected deoxyadenosine phosphoramidite may be added to one feature at the first synthesis cycle and labeled, protected deoxyguanosine phosphoramidite may be added to another feature during the first synthesis cycle. Thus, the oligonucleotide species synthesized in the first feature will have labeled deoxyadenosine at the 3' terminus and the oligonucleotide synthesized in the second feature will have labeled deoxyguanosine at the 3' terminus. At the completion of the synthesis cycle, each feature of the array may contain an oligonucleotide having a nucleotide sequence that differs from the nucleotide sequences of all other oligonucleotides synthesized in all other features. As mentioned above, each feature typically has multiple copies of the oligonucleotide.

In certain embodiments, the same nucleotide having different, distinguishable labels, may be employed in different features. For example, T* may be added to a first feature at the first synthesis cycle and T▲ may be added to a second feature during the first synthesis cycle. Thus, the oligonucleotide species synthesized in the first feature will have T* at the 3' terminus and the oligonucleotide synthesized in the second feature will have T▲ at the 3' terminus. At the completion of the synthesis cycle, each feature of the array may contain an oligonucleotide having a labeling sequence that differs from the labeling sequences of all other features. As mentioned above, each feature typically has multiple copies of a particular oligonucleotide. For example, a second thymidine monomer having a second label distinguishable from the first deposited label in the respective feature may then be deposited to the intended synthesis site to produce a dinucleotide having different distinguishable labels at each synthesis layer. In this manner, all combinations or permutations of printhead combinations may be evaluated on the same substrate, e.g., at the same time, for any misalignment.

It will be apparent that a variety of different labeling protocols may be employed in accordance with the subject invention. For example, T* may be added to more than one feature, e.g., all of the features, at the first synthesis cycle and thereafter T monomers having different labels from the first monomer may be added to the features. For example, T▲ may be added to a first feature during the second synthesis cycle and T■ may be added to a second feature during the second synthesis cycle, etc. For example, the second added monomers may be deposited from different printheads and/or nozzles and/or reservoirs as the first monomer. As will be apparent, this protocol scheme may be repeated for all possible combinations of printheads (nozzles, reservoirs, etc.).

Accordingly, several or all array features may be used to detect the relative alignment of the monomeric fluid droplets deposited on the substrate surface, analogous to that described above. For example, the same label, i.e., a first label, may be employed for all deposited monomers in some or all of the array features, i.e., every monomer layer, except the last deposited monomer such that the last monomer has a label distinguishable from the first label, i.e., the last deposited monomer has a distinguishable second label. The substrate surface is then scanned and the first and second labels are detected. In this manner, detection of the labels will provide the relative shift or misalignment of each monomer droplet with respect to a previous, e.g., the last, deposited monomer droplet.

Figure 8:
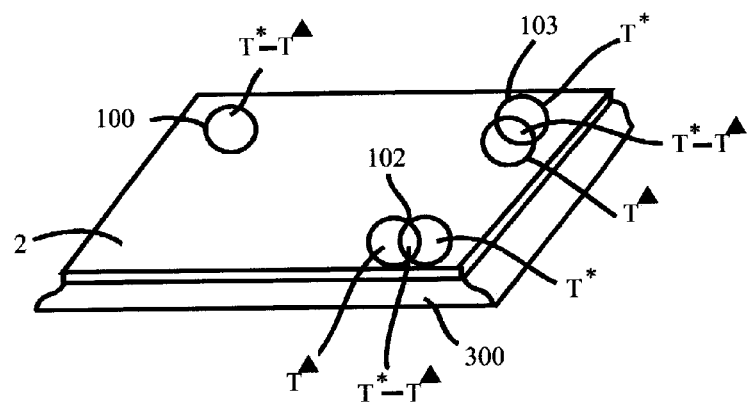
FIG. 8 illustrates how the subject methods may be used to produce the same feature(s) throughout an array to provide diagnostic information regarding any misalignment.

In certain embodiments, the subject methods may be used to produce the same polymer or feature(s) throughout the array, i.e., repeated in different locations on the substrate to provide diagnostic information regarding any misalignment, e.g., the extent of any relative X, Y or Z shifts, as the printhead(s) deposit the monomeric fluid droplets to various locations on the substrate. For example, a first feature 100 may be produced at a first location and a second feature 102 may be produced at a second location and a third feature 104 may be produced at a third location, as shown in FIG. 8. Features 100, 102 and 103 are all made of the same polymer, herein represented as a T*-T▲ dinucleotide, but may be a polymer of greater length in certain embodiments. Accordingly, at the first location 100, a first droplet containing activated nucleoside T having a first label represented by an asterisk is deposited on the substrate surface and second droplet containing activated nucleoside T having a second label that is represented by a triangle is deposited to the precise location of the first droplet such that only the intended T*T▲ polymer is produced. However, due to misalignment, when the polymer is repeated at the second and third locations, 102 and 103 respectively, the second droplet is slightly offset relative to the first deposited droplet. As described above, to determine any misalignment, the substrate is scanned with a suitable detector, e.g., if the labels are fluorescent labels then the substrate may be scanned with a suitable fluorescent scanner that is capable of illuminating the labels and reading the resultant fluorescence.

In this particular embodiment, detecting the labels readily reveals the extent of the misalignment as feature 100 will produce one signal corresponding to the combined signals from the two monomers T* and T▲. However, features 102 and 103 will each produce three distinct signals corresponding to the T* monomer in one of the unintended crescent shaped regions, the T▲ monomer in the other unintended crescent shaped region and a signal corresponding to the combined signals from the dinucleotides in the core region. Accordingly, because shift is not detected in all of the features, it can be concluded that the misalignment is not due to a misalignment between the printheads, but rather due to gradual misalignment of the stage 300 during travel or movement of the stage, e.g., yaw errors.

As mentioned above, the subject methods also include correcting any determined misalignment, where such correction may occur during the synthesis process, i.e., between successive fluid droplet deposition cycles, such that correction of any detected misalignment occurs in "real time" or rather at the time the polymer is being synthesized. That is, in accordance with the subject invention, at least a first and a second monomer are deposited on a substrate surface in a sequential or step-wise manner using a fluid deposition device, wherein the first and second monomers have detectable labels that are distinguishable from each other, to produce a polymer at a particular location on the substrate surface. As described above, the monomers may not be directly bonded to each other such that one or more additional monomers, labeled or unlabeled, may separate the labeled monomers. Once the second monomer is deposited, the substrate is scanned to detect the labels. In those instances where misalignment is detected, adjustment of the fluid deposition device and the substrate surface relative to each other may be performed. For example, the stage supporting the substrate (e.g., stage traveling errors) and/or the alignment system that aligns the printheads and/or the printheads themselves (e.g., the carriage that moves the printheads) may be adjusted based on this misalignment information. As noted above, in many embodiments a printhead includes more than one nozzle and such nozzles cannot be individually adjusted. Thus, in order to adjust or re-align two printheads relative to each other where each printhead has more than one nozzle, the printheads are adjusted to minimize the sum or total of all nozzle misalignments.

FIGS. 9A-9F illustrate the steps of the above described misalignment correction using feedback information from detected labels. As shown in cross sectional view in FIG. 9A, a substrate 2 is positioned on a stage 300 such as an XYZ stage such that at least one polymer can be synthesized on the substrate surface using a fluid deposition device 50. The fluid deposition device is coupled to a processor 56 under the control of an algorithm 55, typically present on a computer readable medium, and also to any appropriate hardware and software, for determining and correcting any misalignment. The processor is, in turn, is coupled to an optical array scanner 57 configured to read or raster across the substrate surface and detect the labels. As such, the scanner scans across the surface of the substrate to detect the detectable labels of the polymer(s). The processor/algorithm then receives this scanning information from the scanner and performs the necessary steps to determine any misalignment and correct the misalignment by adjusting the component, feature, software, etc., responsible for the misalignment, e.g., by alerting an operator to make the necessary adjustment, by altering the locations of the deposited drops to compensate for the misalignment, etc. The fluid deposition device may include the above-described processor and/or algorithm. In certain embodiments, the optical scanning may be performed "off-line" (such as with an independent scanner) with the feature positions characterized relative to alignment markings on the substrate.

Figure 9A:
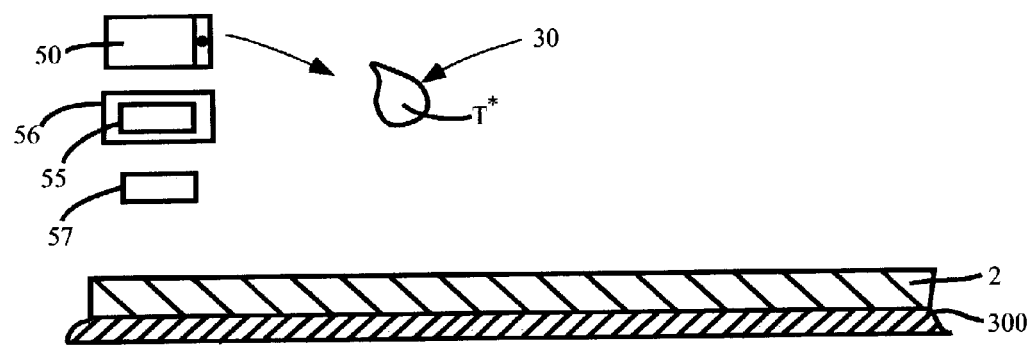
FIGS. 9A-9F illustrate the steps for correcting any misalignment determined by detecting the detected labels bonded to the precursor molecules.
Figure 9B:
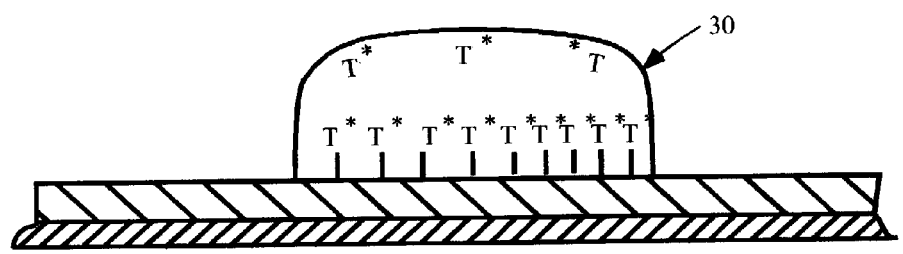
Figure 9C:
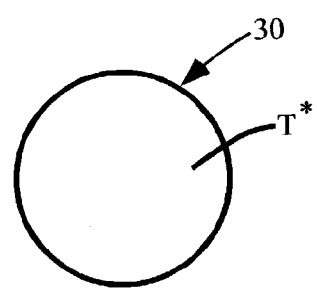
Figure 9D:
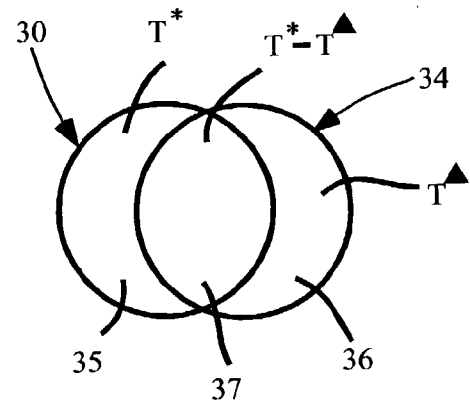

A first droplet 30 containing first monomer having a first label (T*) is deposited on a location of substrate surface 2 from fluid deposition device 50 such that T* monomers are bound to the substrate surface as shown in FIG. 9B and in the top down view of the deposited droplet 30 shown in FIG. 9C. A second droplet 34 containing second monomer labeled with a second detectable label (T▲) is deposited onto the location of the substrate having the first monomer. However, due to misalignment, e.g., between the printheads, second droplet 34 is offset relative to first droplet 30. Due to this misalignment, three distinct regions are produced; a first region 35 having only T* monomer, a second region 36 having only T▲ monomer and a third region 37 having the intended T*-T▲ dinucleotide labeled with both first and second labels, as shown in FIG. 9D. At this point, the substrate surface may be scanned or read by scanning apparatus 57 to detect the surface bound detectable labels. If the labels are fluorescent labels as described above, reading of the substrate surface may be accomplished by illuminating the surface and reading the location and intensity of resulting fluorescence. Information from this scan is transmitted to algorithm 55 and processor 56. Accordingly, scanning the area of the substrate shown in FIG. 9D provides three distinct signals detected from the three distinct regions 35, 36 and 37.

Figure 9E:
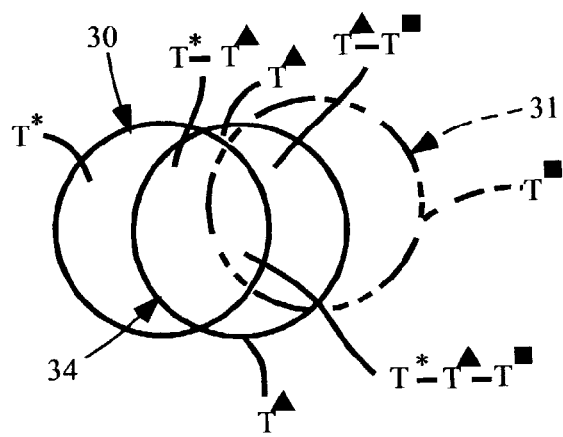
Figure 9F:
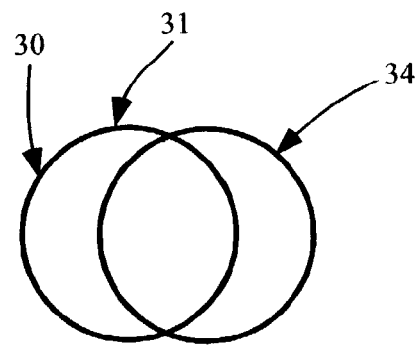

As shown in FIG. 9E, if the misalignment is not corrected, a third, subsequently deposited droplet 31 (shown in phantom) deposited onto the location of the substrate having the first and second monomers may also be misaligned. However, in the subject methods, after misalignment of the second droplet is detected, the fluid deposition device and the intended targeted location on the substrate may be adjusted relative to each other, e.g., the processor under the control of the algorithm adjusts at least one of the stage that supports the substrate, the fluid deposition device (e.g., the alignment system, the printheads, etc.) to re-align or rather to correct for the misalignment so that subsequently deposited monomers are not misaligned. FIG. 9F shows the results of such an adjustment such that due to the correction of the misalignment, third droplet 31 is precisely deposited onto the location of the substrate surface having the first droplet. This process may be iterated for some or all successively deposited droplets.

Computer Readable Medium

One or more aspects of the subject invention may be in the form of computer readable media having programming stored thereon for implementing the subject methods. The computer readable media may be, for example, in the form of a computer disk or CD, a floppy disc, a magnetic "hard card", a server, or any other computer readable media capable of containing data or the like, stored electronically, magnetically, optically or by other means. Accordingly, stored programming embodying steps for carrying-out the subject methods may be transferred or communicated to a computer such as a personal computer (PC), a fluid deposition device, or the like, by physical transfer of a CD, floppy disk, or like medium, or may be transferred using a computer network, server, or other interface connection, e.g., the Internet, or other relay means.

More specifically, computer readable medium may include stored programming embodying an algorithm for carrying out the subject methods. Accordingly, such a stored algorithm is configured to, or is otherwise capable of, receiving information from an optical scanner regarding detected signals from a location of a substrate surface and determining any misalignment between a fluid deposition device and the location of the substrate surface during deposition of fluid from the deposition device. The subject algorithm and associated processor may also be capable of implementing the appropriate adjustment(s) to the fluid deposition device and the substrate surface relative to each other to correct for the misalignment. In one embodiment of the subject invention, a system of the invention may include a fluid deposition device with the above-described stored algorithm capable of carrying out the steps for producing a polymer at a location on a substrate surface according to the subject methods.

Arrays Produced According to the Subject Methods

Also provided by the subject invention are arrays of polymers, e.g., nucleic acids, polypeptides, etc, as described above. That is, a plurality of polymers (oftentimes referred to as probes, binding agents or members of a binding pair in this context) covalently bonded to a substrate surface in the form of an "array" or pattern is provided. At least one of the polymers of the array includes a first residue bonded to a first detectable label and a second residue bonded to a second detectable label, where the two labels are distinguishable from each other, where the residues may be the same or may be different. In certain embodiments, a residue is a sequence with more than one type of monomer, e.g., a first residue may be a sequence of two types of monomers, e.g., $(TG)_n$, and a second residue may be a sequence of two types of monomers, e.g., $(CA)_n$, where "n" is an integer. As described above, the first and second residues may or may not be bonded directly to each other such that in certain embodiments the first and second residues may have one or more residues, which may or may not be labeled, therebetween. Such arrays find use in a variety of applications, including gene expression analysis, drug screening, nucleic acid sequencing, mutation analysis, and the like.

The subject arrays include at least two distinct polymers that differ by monomeric sequence attached to different and known locations on the substrate surface. Each distinct polymeric sequence of the array is typically present as a composition of multiple copies of the polymer on a substrate surface, e.g., as a spot or feature on the surface of the substrate. The number of distinct polymeric sequences, and hence spots or similar structures, present on the array may vary, where a typical array may contain more than about ten, more than about one hundred, more than about one thousand, more than about ten thousand or even more than about one hundred thousand features in an area of less than about 20 $cm^2$ or even less than about 10 $cm^2$. For example, features may have widths (that is, diameter, for a round spot) in the range from about 10 μm to about 1.0 cm. In other embodiments, each feature may have a width in the range from about 1.0 μm to about 1.0 mm, usually from about 5.0 μm to about 500 μm and more usually from about 10 μm to about 200 μm. Non-round features may have area ranges equivalent to that of circular features with the foregoing width (diameter) ranges. At least some, or all, of the features are of different compositions (for example, when any repeats of each feature composition are excluded, the remaining features may account for at least about 5%, 10% or 20% of the total number of features). Interfeature areas will typically (but not essentially) be present which do not carry any polynucleotide (or other biopolymer or chemical moiety of a type of which the features are composed). Such interfeature areas typically will be present where the arrays are formed by processes involving drop deposition of reagents, but may not be present when, for example, photolithographic array fabrication process are used. It will be appreciated though, that the interfeature areas, when present, could be of various sizes and configurations. The spots or features of distinct polymers present on the array surface are generally present as a pattern, where the pattern may be in the form of organized rows and columns of spots, e.g. a grid of spots, across the substrate surface, a series of curvilinear rows across the substrate surface, e.g. a series of concentric circles or semi-circles of spots, and the like.

In the broadest sense, the arrays are arrays of polymeric or biopolymeric ligands or molecules, i.e., binding agents. In many embodiments of interest, the arrays are arrays of nucleic acids, including oligonucleotides, polynucleotides, cDNAs, mRNAs, synthetic mimetics thereof, and the like.

Each array may cover an area of less than about 100 $cm^2$, or even less than about 50 $cm^2$, 10 $cm^2$ or 1 $cm^2$. In many embodiments, the substrate carrying the one or more arrays will be shaped generally as a rectangular solid (although other shapes are possible), having a length of more than about 4 mm and less than about 1 m, usually more than about 4 mm and less than about 600 mm, more usually less than about 400 mm; a width of more than about 4 mm and less than about 1 m, usually less than about 500 mm and more usually less than about 400 mm; and a thickness of more than about 0.01 mm and less than about 5.0 mm, usually more than about 0.1 mm and less than about 2 mm and more usually more than about 0.2 and less than about 1 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, the substrate may transmit at least about 20%, or about 50% (or even at least about 70%, 90%, or 95%), of the illuminating light incident on the substrate as may be measured across the entire integrated spectrum of such illuminating light or alternatively at 532 nm or 633 nm.

A feature of the subject arrays, which feature results from the protocol employed to manufacture the arrays, is that some or all of the monomers that make-up the polymers of the array have a detectable label. At least one of the polymers includes two distinguishable labels. As such, the labels may be detected to determine any misalignment between a fluid deposition device and a location of a substrate surface during the deposition process.

Utility

The subject arrays find use in a variety of different applications, where such applications are generally analyte detection applications in which the presence of a particular analyte in a given sample is detected at least qualitatively, if not quantitatively. Protocols for carrying out such assays are well known to those of skill in the art and need not be described in great detail here. Generally, the sample suspected of comprising the analyte of interest is contacted with an array produced according to the subject methods under conditions sufficient for the analyte to bind to its respective binding pair member that is present on the array. Thus, if the analyte of interest is present in the sample, it binds to the array at the site of its complementary binding member and a complex is formed on the array surface. The presence of this binding complex on the array surface is then detected, e.g. through use of a signal production system, e.g. an isotopic or fluorescent label present on the analyte, etc. The presence of the analyte in the sample is then deduced from the detection of binding complexes on the substrate surface.

Specific analyte detection applications of interest include hybridization assays in which nucleic acid arrays of the subject invention are employed. In these assays, a sample of target nucleic acids is first prepared, where preparation may include labeling of the target nucleic acids with a label, e.g. a member of signal producing system. Following sample preparation, the sample is contacted with the array under hybridization conditions, whereby complexes are formed between target nucleic acids that are complementary to probe sequences attached to the array surface. The presence of hybridized complexes is then detected. Specific hybridization assays of interest which may be practiced using the subject arrays include: gene discovery assays, differential gene expression analysis assays; nucleic acid sequencing assays, and the like. Patents describing methods of using arrays in various applications include: U.S. Pat. Nos. 5,143, 854; 5,288,644; 5,324,633; 5,432,049; 5,470,710; 5,492, 806; 5,503,980; 5,510,270; 5,525,464; 5,547,839; 5,580, 732; 5,661,028; 5,800,992; the disclosures of which are herein incorporated by reference.

In certain embodiments, the subject methods include a step of transmitting data from at least one of the detecting and deriving steps, as described above, to a remote location. By "remote location" is meant a location other than the location at which the array is present and hybridization occur. For example, a remote location could be another location (e.g. office, lab, etc.) in the same city, another location in a different city, another location in a different state, another location in a different country, etc. As such, when one item is indicated as being "remote" from another, what is meant is that the two items are at least in different buildings, and may be at least one mile, ten miles, or at least one hundred miles apart. "Communicating" information means transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, Internet, etc.

As such, in using an array made by the method of the present invention, the array will typically be exposed to a sample (for example, a fluorescently labeled analyte, e.g., protein containing sample) and the array then read. Reading of the array may be accomplished by illuminating the array and reading the location and intensity of resulting fluorescence at each feature of the array to detect any binding complexes on the surface of the array. For example, a scanner may be used for this purpose which is similar to the AGILENT MICROARRAY SCANNER available from Agilent Technologies, Palo Alto, Calif. Other suitable apparatus and methods are described in U.S. patent application Ser. No. 09/846,125 "Reading Multi-Featured Arrays" by Dorsel et al.; and Ser. No. 09/430,214 "Interrogating Multi-Featured Arrays" by Dorsel et al. As previously mentioned, these references are incorporated herein by reference. However, arrays may be read by any other method or apparatus than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature which is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

Kits

Finally, kits for use in analyte detection assays are provided. The subject kits at least include the arrays of the subject invention. The kits may further include one or more additional components necessary for carrying out an analyte detection assay, such as sample preparation reagents, buffers, labels, and the like. As such, the kits may include one or more containers such as vials or bottles, with each container containing a separate component for the assay, and reagents for carrying out an array assay such as a nucleic acid hybridization assay or the like. The kits may also include a denaturation reagent for denaturing the analyte, buffers such as hybridization buffers, wash mediums, enzyme substrates, reagents for generating a labeled target sample such as a labeled target nucleic acid sample, negative and positive controls and written instructions for using the subject array assay devices for carrying out an array based assay. The instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., CD-ROM, diskette, Experimental The following examples are put forth so as to provide those of ordinary skill in the art with a complete disclosure and description of how to make and use the present invention, and are not intended to limit the scope of what the inventors regard as their invention. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

1) Quantification of Successive Misalignments in a Coupling Chamber

A substrate functionalized with chemical moieties compatible with standard phosphoramidite chemistry was introduced in a coupling chamber filed with inert gas. The substrate was aligned to its reference position (0,0) using an alignment system attached to the chamber and fiducial marks scribed on the substrate. Without stage movement, between 100 to 150 pL of Cy3 labeled T phosphoramidite at a 100 mM concentration, activated with tetrazol (100 mM), was deposited onto the substrate using nozzles linked to a first reservoir. The substrate was removed from the coupling chamber and placed in a flow cell, where the phosphite bound formed in the coupling chamber was oxidized by standard iodine oxidation and where the 5'-DMT protecting groups were removed by standard detritylation reaction.

After appropriate washing, the substrate was returned to the coupling chamber and realigned using the same alignment technique and fiducial marks. An X,Y offset was utilized to place the previously synthesized features below the theoretical positions of nozzles from a second reservoir attached to the same printhead as employed in the previous deposition. (The two reservoirs were manufactured within the same printhead and therefore should, by design, be aligned with respect to each other.) Without stage movement, the same volume of activated Cy5 labeled T phosphoramidite (100 mM) was then deposited at the same location previously used for the first deposition. After deposition, the substrate was again transferred into the flow cell, then oxidized and detritylated as previously described. The substrate was then scanned and the fluorescent signals of both dyes detected using the proper excitation and emission wavelengths on an Agilent Technologies Microarray Scanner.

The relative misalignment between the first and second depositions was determined by quantifying the size and orientation of the crescent-shaped areas on the substrate containing fluorescent signal from only one of the two dyes. This misalignment is due to the misalignment between the nozzles of the reservoirs and to the alignment error between the first and second alignment in the coupling chamber.

The above described protocol may be repeated several times to quantify the variations in size and direction (X,Y) of the relative misalignments between the first and second depositions. Such variations are due to alignment error in the coupling chamber and can be corrected appropriately (alignment algorithm, stage optimization, etc.).

2) Quantification of Nozzle Misalignment from Two Reservoirs from a Same Printhead An analogous protocol as used in the above-described experiment no. 1 was used to verify the relative alignment of two reservoirs from the same printhead. Generally, this protocol included: 1) positioning the substrate to an initial location in a coupling chamber, 2) without stage travel, depositing a first labeled phosphoramidite (such as Cy3-T), 3) oxidizing and detritylating the monomer coupled in step 2 in a flow cell, 4) re-positioning the substrate in the coupling chamber with a X,Y offset corresponding to the theoretical position offset between the two printheads, 5) without stage travel, depositing a second labeled phosphoramidite (such as Cy5-T) from a second reservoir of the same printhead, 6) oxidizing and detritylating the monomer coupled in step 5 in a flow cell, and 7) scanning the substrate.

The relative misalignment between the first and second depositions was determined by quantifying the size and orientation of the crescent shaped areas on the substrate containing fluorescent signal from only one of the two dyes. The above-described protocol may be repeated to determine the X,Y offset resulting in the least misalignment between the two deposition events, thus experimentally verifying the relative alignment of the two reservoirs from the same printhead. Misalignment errors in the coupling chamber were corrected. The same procedure may be used to verify the relative alignment of all nozzles from all reservoirs with respect to other nozzles from other reservoirs on the same printhead.

3) Quantification of Nozzle Misalignment from Two Reservoirs from Different Printheads An analogous protocol as used in the above-described experiment no. 1 was used to verify the relative alignment of two printheads. Generally, this protocol included: 1) positioning a substrate to an initial location in a coupling chamber, 2) without stage travel, depositing a first labeled phosphoramidite (such as Cy3-T), 3) oxidizing and detritylating the monomer coupled in step 2 in a flow cell, 4) re-positioning the substrate in the coupling chamber with a X,Y offset corresponding to the position offset between the two printheads, 5) without stage travel, depositing a second labeled phosphoramidite (such as Cy5-T) from a second printhead, 6) oxidizing and detritylating the monomer coupled in step 5 in a flow cell, and 7) scanning the substrate.

The relative misalignment between the first and second depositions was determined by quantifying the size and orientation of the crescent shaped areas on the substrate containing fluorescent signal from only one of the two dyes. The above-described protocol may be repeated to determine any X,Y offset resulting in the least misalignment between the two deposition events, thus experimentally verifying the relative alignment of the two reservoirs from two different printheads.

4) Quantification of Stage Travel Error

An analogous protocol as used in the above-described experiment no. 1 was used to quantify the relative stage travel error. Generally, this protocol included: 1) positioning the substrate to an initial location in a coupling chamber, 2) with stage travel, depositing at a known interval a series of features containing a first labeled phosphoramidite (such as Cy3-T), 3) oxidizing and detritylating the monomer coupled in step 2 in a flow cell, 4) re-positioning the substrate in the coupling chamber with a X,Y offset corresponding to the position offset between the two reservoirs, 5) with stage travel, depositing at a same interval a series of features (same intended location as previously used) containing a second labeled phosphoramidite (such as Cy5-T) from a second reservoir, 6) oxidizing and detritylating the monomer coupled in step 5 in a flow cell, and 7) scanning the substrate.

The relative misalignment between the first and second depositions for each feature along the stage travel path was determined by quantifying the size and orientation of the crescent shaped areas on the substrate containing fluorescent signal from only one of the two dyes. The center and amplitude of the stage travel error may be quantified in both (X,Y) dimensions by quantifying the change in measured misalignment along the stage travel path.

5. Quality Control of an Array Synthesis

An analogous protocol as used in the above-described experiment no. 1 was used as a quality control (QC) tool to verify the sequence integrity of features present on an array substrate. At each layer of an array synthesis, activated fluorescein labeled T phosphoramidite features were deposited on a QC area of the substrate and at substrate locations absent features. During the synthesis of the last layer, activated Cy5 labeled T phosphoramidite was deposited to all of the features previously prepared with the fluorescein labeled T phosphoramidite. After completion of all the chemical steps including deprotection of the DNA protecting groups, the QC area of the substrate was separated from the substrate and scanned.

The relative misalignment between the first and second depositions within each feature was determined by quantifying the size and orientation of the crescent shaped areas on the substrate containing fluorescent signal from only one of the two dyes. Since these individual features determine the relative misalignment between one synthesis layer and the final layer, it was possible to determine whether the correct alignment was obtained at every layer and, therefore, whether the sequence uniformity of the features of the synthesized array was compromised.

It is evident from the above results and discussion that the above described invention provides an important new protocol for producing at least one polymer at a location of a substrate surface. Specifically, the subject methods provide for protocols of in situ synthesis of polymers and polymeric arrays using a fluid deposition device that easily and effectively detect misalignments between the fluid deposition device and the location of the substrate surface, and which enable immediate or "real time" detection and/or adjustments of the fluid deposition device and substrate surface relative to each other if misalignment is detected so that the misalignment may be corrected for subsequent depositions. As such, the subject invention represents a significant contribution to the art.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method for determining relative misalignment of a fluid deposition device during polymer production on the surface of a substrate, said method comprising:
   (a) depositing a fluid droplet containing a first monomer labeled with a first detectable label from a fluid deposition device onto an intended deposition location of a substrate surface to produce a polymer at said intended deposition location, wherein said intended deposition location comprises a second monomer labeled with a second detectable label and said first and second detectable labels are distinguishable from each other; and
   (b) detecting said first and second detectable labels to determine any relative misalignment between said fluid deposition device and said intended deposition location to determine relative misalignment of said fluid deposition device during polymer production on the surface of said substrate.

2. The method according to claim 1, wherein said fluid deposition device is a pulsejet fluid deposition device.

3. The method according to claim 1, further comprising adjusting said fluid deposition device and said substrate surface relative to each other if relative misalignment is detected.

4. The method according to claim 3, wherein said adjustment comprises adjusting at least one of a stage supporting said substrate and said fluid deposition device.

5. The method according to claim 4, wherein said stage is an XYZ stage.

6. The method according to claim 3, wherein said adjustment occurs prior to deposition of an additional monomer.

7. The method according to claim 1, wherein said first monomer is covalently bonded to said second monomer upon said depositing.

8. The method according to claim 7, wherein said first monomer is covalently bonded to a polymer that includes said second monomer upon said depositing, but is not covalently bonded directly to said second monomer.

9. The method according to claim 1, wherein said polymer is a nucleic acid.

10. The method according to claim 1, wherein said polymer is a polypeptide.

11. The method according to claim 1, wherein said first and second detectable labels are fluorescent.

12. The method according to claim 1, wherein said detecting comprises optically scanning said substrate surface.

13. The method according to claim 1, wherein said method further comprises depositing said second monomer onto said intended deposition location of said substrate with a fluid deposition device.

14. The method according to claim 13, wherein one or more additional monomers are deposited onto said intended deposition location of said substrate prior to depositing said first monomer labeled with said first detectable label.

15. The method according to claim 1, wherein said method is a method of producing two different polymers at two different intended deposition locations of said substrate.

16. The method according to claim 15, wherein said method is a method of producing a polymeric array.

17. The method according to claim 16, wherein said polymeric array is a nucleic acid array.

18. The method according to claim 16, wherein said polymeric array is a polypeptide array.

19. The method according to claim 1, wherein said first and second monomers are the same.

20. The method according to claim 1, wherein said first and second monomers are different.

* * * * *